(12) United States Patent
Tenmyo

(10) Patent No.: US 6,741,014 B2
(45) Date of Patent: May 25, 2004

(54) LIGHT EMITTING DEVICE AND CAMERA HAVING THE SAME

(75) Inventor: Yoshiharu Tenmyo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 09/941,334

(22) Filed: Aug. 29, 2001

(65) Prior Publication Data

US 2002/0063501 A1 May 30, 2002

(30) Foreign Application Priority Data

Sep. 1, 2000  (JP) ........................... 2000-265769

(51) Int. Cl.[7] ........................ G03B 19/00; G03B 15/05; H01J 61/40
(52) U.S. Cl. ........................ 313/110; 313/114; 313/112; 359/834; 362/16; 362/328; 396/21; 396/200; 348/337
(58) Field of Search ........................ 313/110–114, 116; 359/831, 834, 833; 362/16–18, 326, 327, 328, 346, 4; 396/61, 62, 200, 21; 348/370, 174, 337

(56) References Cited

U.S. PATENT DOCUMENTS 6,011,929 A * 1/2000 Fuke et al. ................. 396/175

6,404,988 B1 * 6/2002 Tanabe ........................ 396/62

OTHER PUBLICATIONS

Japanese Patent Laid–Open Publication No. 04–138439, published May 12, 1992.

Japanese Patent Laid–Open Publication No.08–262538, published Oct. 11, 1996.

* cited by examiner

Primary Examiner—Ashok Patel
(74) Attorney, Agent, or Firm—Robin, Blecker & Daley

(57) ABSTRACT

There is provided a light emitting device that is capable of changing the illumination angle in the transverse and vertical directions. An emission unit includes at least an arc tube being elongated in a longitudinal direction thereof, and a reflection umbrella. A light-permeable optical unit is arranged in front of the emission unit at a side thereof closer to a subject in such a manner that a relative distance between the optical unit and the emission unit is variable. The optical unit includes a plurality of light refracting sections provided at a central portion thereof and arranged in the longitudinal direction of the arc tube, and reflection surfaces provided at the opposite sides of the light refracting sections in the longitudinal direction thereof for reflecting luminous fluxes emitted from the emission unit toward a subject. The light distribution characteristics in transverse and vertical directions can be varied by changing the interval between the emission unit and the optical unit.

12 Claims, 17 Drawing Sheets

LIGHT EMITTING DEVICE AND CAMERA HAVING THE SAME

BACKGROUND OF THE INVENTION

1. Field of the Invention

This invention relates to a light emitting device capable of changing an illumination range and a camera having the same.

2. Description of the Related Art

Conventionally, a variety of illuminating devices for use in a photographing apparatus such as a camera have been proposed in order to efficiently converge luminous fluxes, which are emitted from a light source in various directions, within a required illumination angle of view.

Particularly in recent years, the convergence efficiency have been improved and the size of a photographing apparatus has been reduced by providing an optical member that performs total reflection on a prism, a light guide, and the like in place of a Fresnel lens, which is conventionally disposed in front of a light source.

In recent years, a photographing apparatus such as a camera has been reduced in size and weight whereas the zooming magnification of a taking lens has been increasing. Generally, a full aperture f-number of the taking lens tends to gradually increase with the reduction in size of the photographing apparatus and the increase in the magnification. If a picture is taken without using an auxiliary light source, an image on the picture is unexpectedly blurred due to the motion of the photographer's hand or the motion of a subject, or a failed picture is produced due to underexposure. To address this problem, an illuminating device serving as an auxiliary light source is usually built in the photographing apparatus.

Under the circumstances, the frequency with which the illuminating device is used is increased to a large extent, and the quantity of emitted light required for one photography is increased. Thus, the illumination range is usually fixed correspondingly to the wide-angle photography, and an undesired range is illuminated in the telephotography. It is therefore disadvantageous to use an illuminating device with a fixed wide illumination range since a large amount of energy is lost.

Accordingly, a variety of illuminating devices have been proposed which are capable of changing the illumination range so as to illuminate only a range corresponding to a shooting angle of view to thus save power. In particular, some illuminating devices have been proposed which improve the luminous efficiency by total reflection.

For example, an illuminating device proposed in Japanese Laid-Open Patent Publication No. 4-138439 (Kokai) by the assignee of the present invention has a convergent optical system arranged at a front portion of the illuminating device and comprised of an optical prism having two upper and lower entrance surfaces having a positive refracting power and which luminous fluxes emitted mainly from a light source laterally with respect to an exit optical axis enter, two upper and lower total reflection surfaces upon which the luminous fluxes are totally reflected, and exit surfaces through which the totally reflected fluxes are emitted toward a subject. In this convergent optical system, the positions of the optical prism and the light source are relatively changed to cause the luminous fluxes to be reflected by or transmitted through the total reflection surfaces to thereby change the illumination range.

In an illuminating device proposed in Japanese Laid-Open Patent Publication (Kokai) No. 8-262538, an optical prism is divided into a plurality of parts, and the optical prism disposed vertically is rotated to change the illumination range.

However, the illuminating devices disclosed in the above publications provide a relatively easy convergence and diffusion control of directing the luminous fluxes in a diametrical direction of a cylindrical discharge arc tube as the light source, i.e. in a direction (vertical direction) orthogonal to the longitudinal direction of the light source (transverse direction with respect to the axis of illumination light), but do not provide a convergence diffusion control of directing the luminous fluxes in the longitudinal direction of the light source (transverse direction with respect to the axis of illumination light). Therefore, the illumination range cannot always be controlled in an ideal manner because the illumination range can be controlled only in the longitudinal direction.

SUMMARY OF THE INVENTION

It is therefore an object of the present invention to provide a light emitting device that can be reduced in size as a whole, and that is capable of efficiently utilizing energy from a light source and changing the illumination angle in the transverse direction, and a camera incorporating the light emitting device.

It is another object of the present invention to provide a light emitting device that is capable of changing the illumination angle in the transverse and vertical directions, and a camera incorporating the light emitting device.

To attain the above objects, the present invention provides a light emitting device comprising an emission unit including at least an arc tube being elongated in a longitudinal direction thereof, the arc tube having opposite ends in the longitudinal direction thereof, and a reflection umbrella, and a light-permeable optical unit arranged in front of the emission unit at a side thereof closer to a subject in a manner such that a relative distance between the optical unit and the emission unit is variable, the optical unit having reflection surfaces for reflecting luminous fluxes emitted from the emission unit toward the subject, the reflection surfaces being located at locations corresponding to the opposite ends of the arc tube in the longitudinal direction thereof.

In a preferred form of the present invention, the optical unit has a plurality of cylindrical lenses formed at a central portion thereof and arranged in parallel with the longitudinal direction of the arc tube.

Preferably, the reflection surfaces of the optical unit are disposed such that they do not reflect the luminous fluxes when the optical unit is close to the emission unit but reflect the luminous fluxes when the optical unit is apart from the emission unit.

Also preferably, the emission unit comprises a light refracting section provided at a central portion thereof for refracting light from the arc tube and projecting the light to the subject, the light refracting section having opposite sides, and an optical member having a reflecting section for totally reflecting light from the arc tube to the opposite sides of the light reflecting section and projecting the light to the subject.

Preferably, the optical unit includes prism sections having prism surfaces and projecting from the optical unit toward the arc tube, and the reflection surfaces are the prism surfaces of the prism sections.

To attain the above objects, the present invention further provides alight emitting device comprising an emission unit including at least an arc tube being elongated in a longitudinal direction thereof, the arc tube having opposite ends in the longitudinal direction thereof, and a reflection umbrella, and a light-permeable optical unit arranged in front of the emission unit at a side thereof closer to a subject in a manner such that a relative distance between the optical unit and the emission unit is variable, the optical unit including a plurality of light refracting sections provided at a central portion thereof and arranged in parallel with the longitudinal direction of the arc tube, the light refracting sections having opposite sides in a longitudinal direction thereof, and reflection surfaces provided at the opposite sides in the longitudinal direction of the light refracting sections for reflecting luminous fluxes emitted from the emission unit toward a subject.

Preferably, the light refracting sections comprise cylindrical lenses.

To attain the above object, the present invention also provides a camera having a light emitting device constructed as above.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The present invention will now be described in detail with reference to the drawings showing embodiments thereof.

Figure 1:
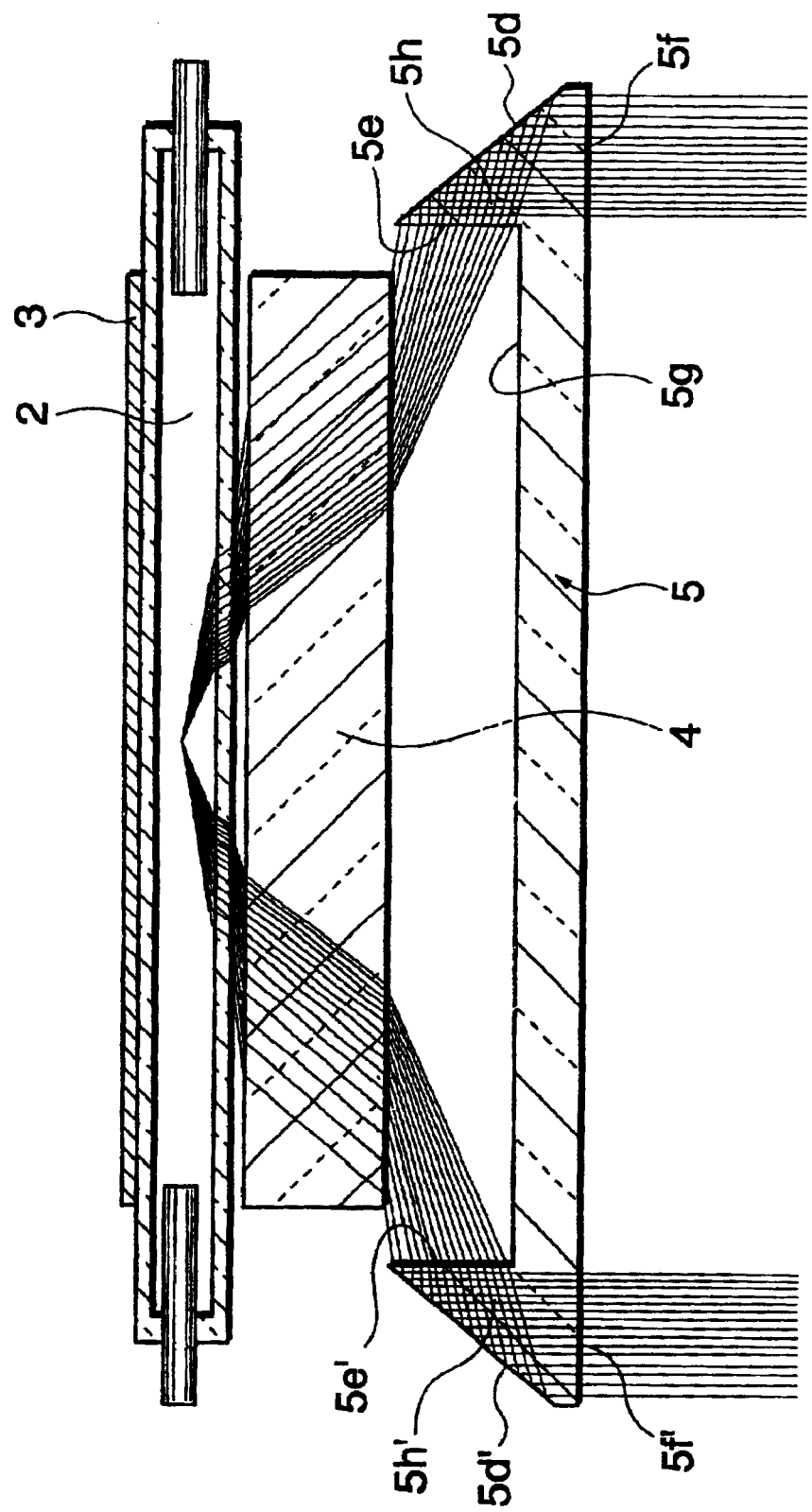
FIG. 1 is a horizontal longitudinal sectional view showing an illuminating device as a light emitting device according to a first embodiment of the present invention, which is in a narrow illumination range position, taken along the axis of a discharge tube.
Figure 2:
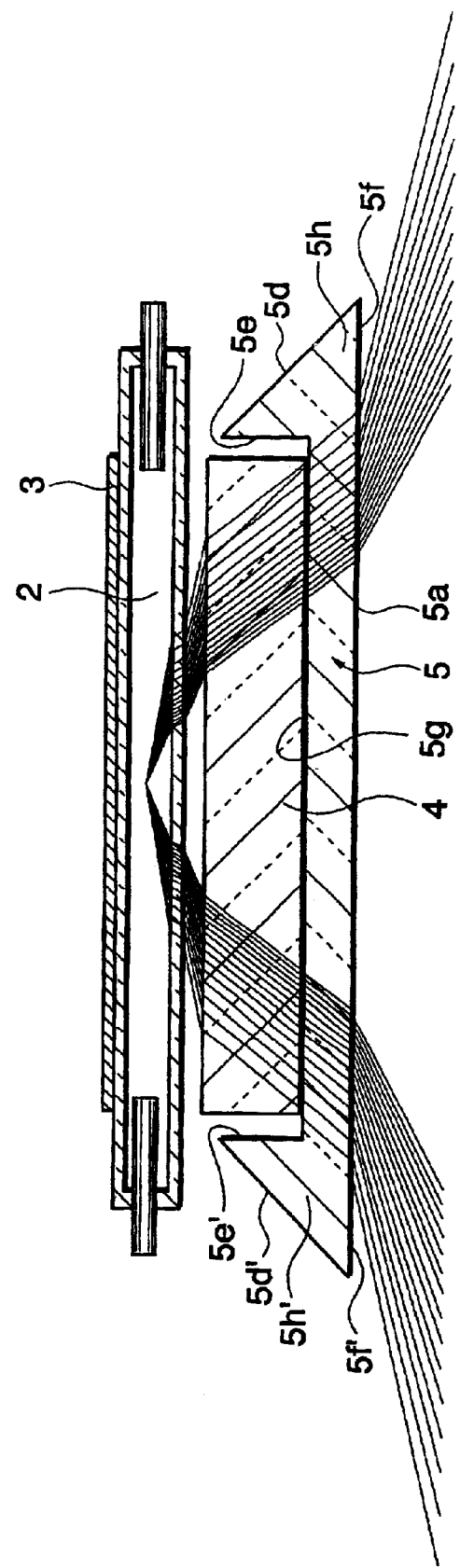
FIG. 2 is a horizontal longitudinal sectional view showing the illuminating device, which is in a wide illumination range position, taken along the axis of the discharge tube.
Figure 3:
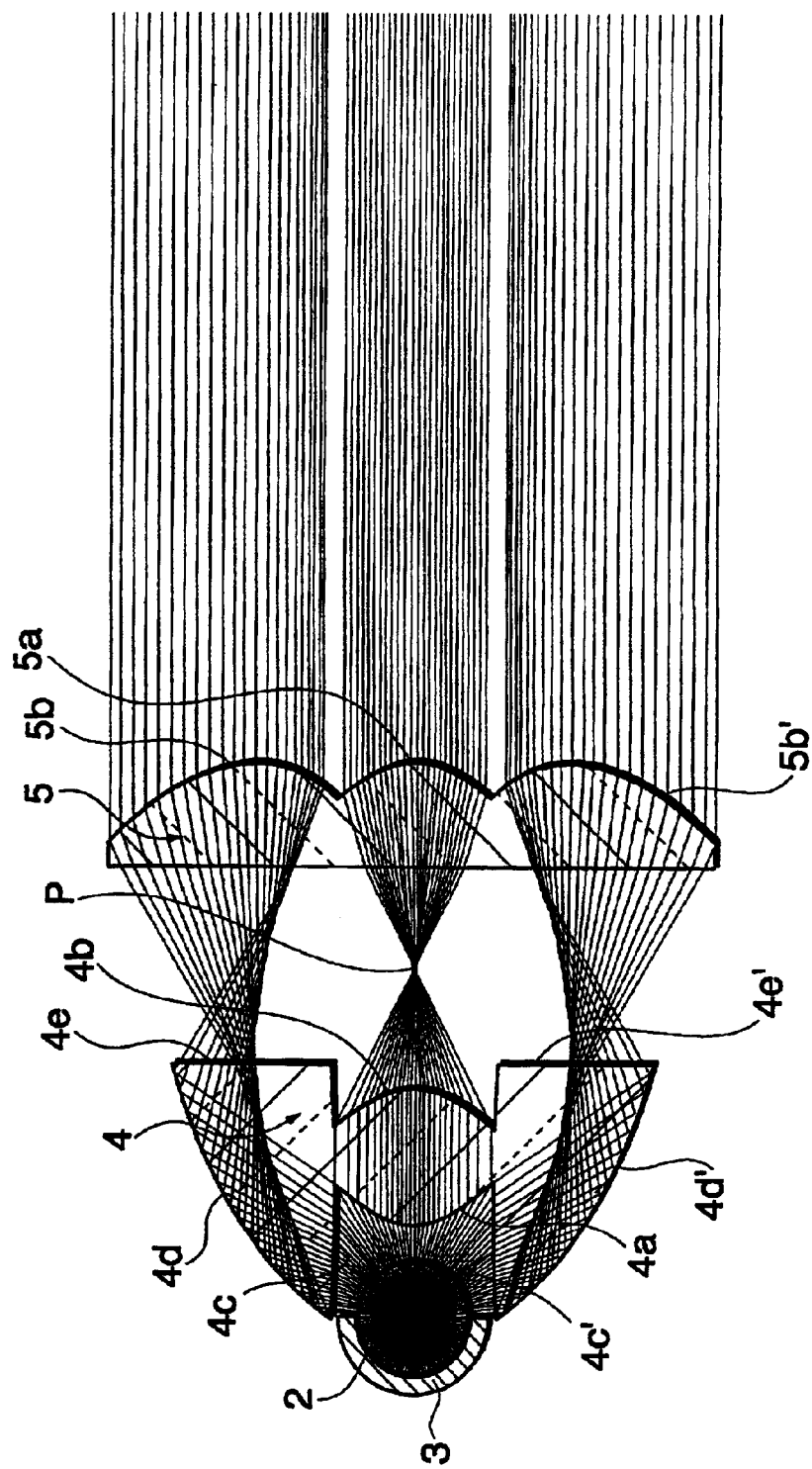
FIG. 3 is a vertical longitudinal sectional view showing the illuminating device, which is in a narrow illumination range position, taken in a diametric direction of the discharge tube.
Figure 4:
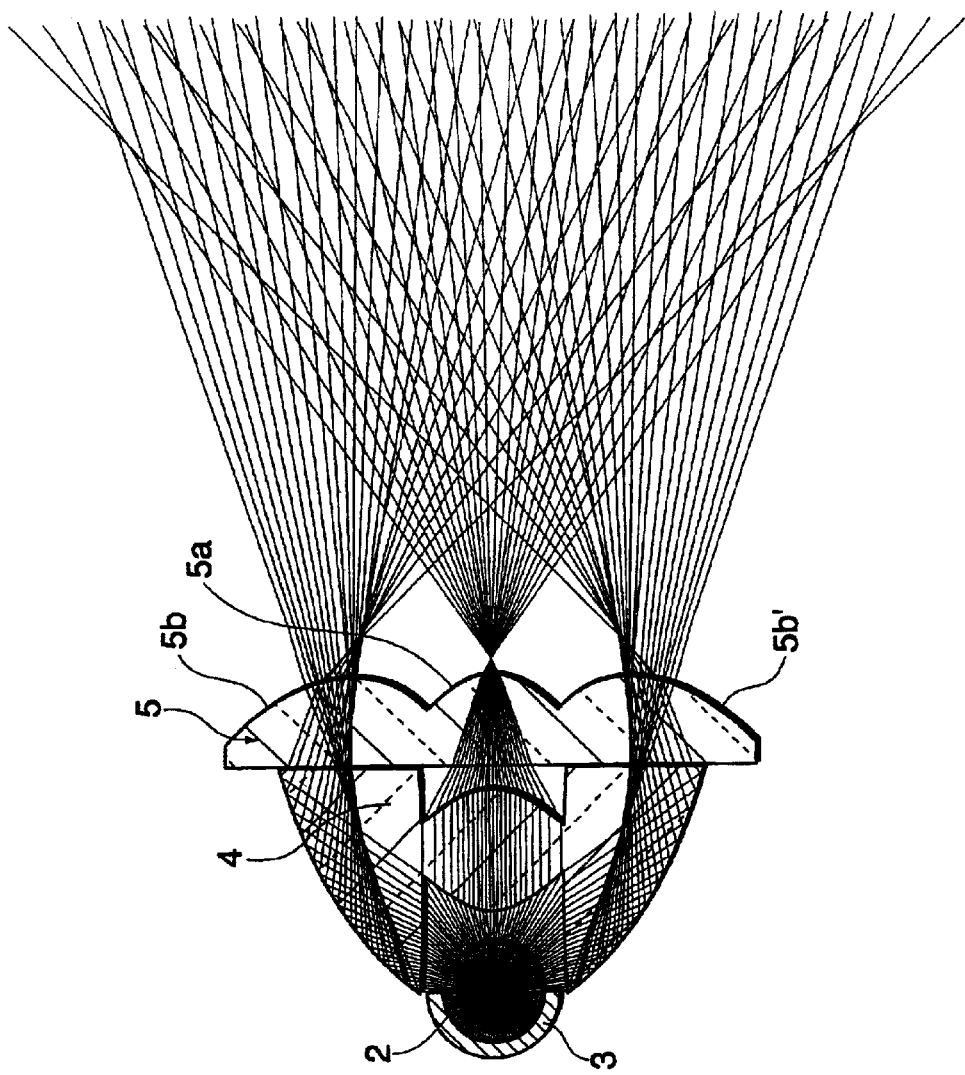
FIG. 4 is a vertical longitudinal sectional view showing the illuminating device, which is in a wide illumination range position, taken in the diametric direction of the discharge tube.
Figure 5:
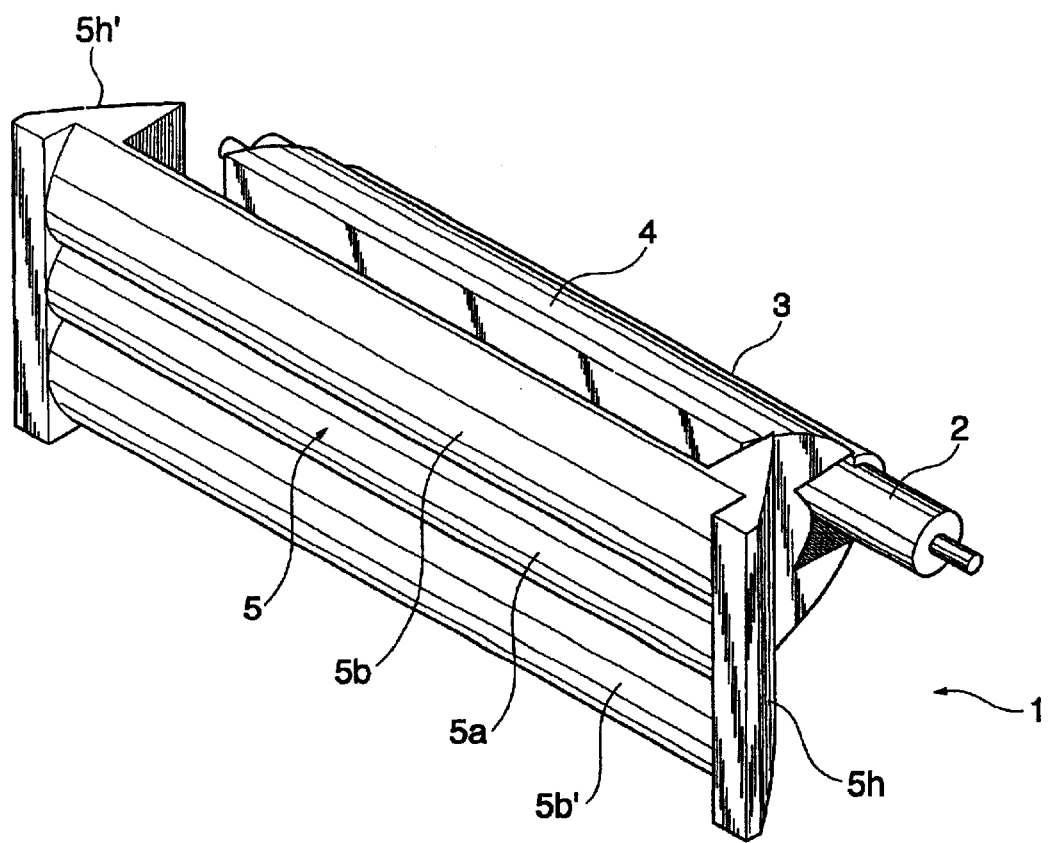
FIG. 5 is a perspective view showing essential parts of an optical system of the illuminating device.
Figure 6:
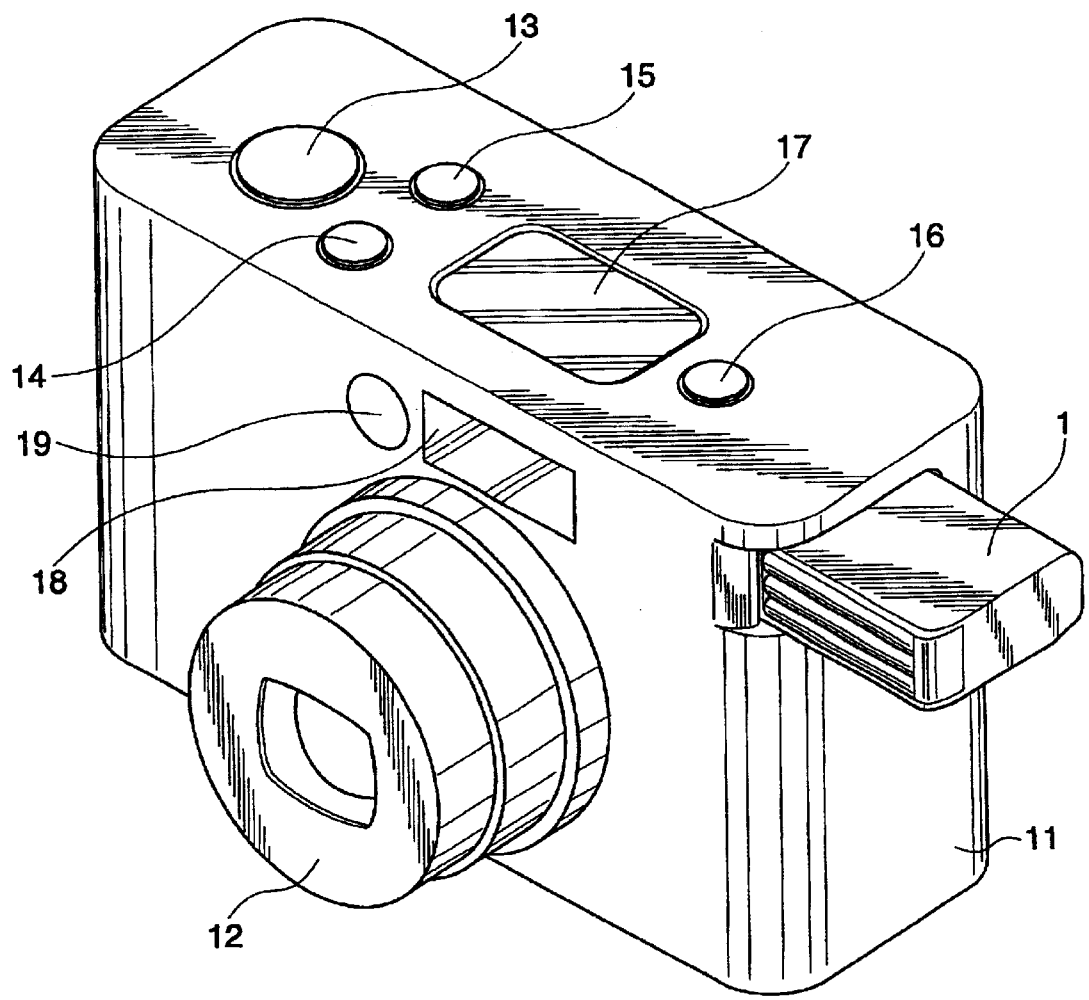
FIG. 6 is a perspective view showing a camera to which the illuminating device according to the first embodiment is applied.

FIGS. 1 to 6 show an illuminating device as a light emitting device according to a first embodiment of the present invention. FIGS. 1 and 2 are horizontal longitudinal sectional views showing essential parts of an optical system of the illuminating device, whereas FIGS. 3 and 4 are vertical longitudinal sectional views showing essential parts of the optical system of the illuminating device. FIG. 5 is a perspective view showing only the principal optical system of the illuminating device, and FIG. 6 is a perspective view showing a camera having the illuminating device. FIGS. 1 to 4 also show the traces of typical light rays emitted from a light source.

First, there will be described the whole arrangement of the camera having the illuminating device. As shown in FIG. 6, the illuminating device 1 is retractably disposed in an upper section of a camera body 11, and is designed to project from a lateral side of the camera body 11 when the camera is used.

In FIG. 6, reference numeral 12 denotes a lens barrel that holds a taking lens; 13, a shutter release button; 14, a telephoto zooming button; 15, a wide-angle zooming button; 16, an operating button for changing the mode of the camera; 17, a liquid crystal display window for giving information on the operation of the camera to a user; 18, a light receiving window of a photometer that measures the brightness of external light; and 19, an objective window of a finder. It should be noted that the camera having the illuminating device according to the present invention should not necessarily be limited to a camera having this arrangement.

Referring next to FIG. 5, there will be described the components of the illuminating device relating to the optical characteristics. In FIG. 5, reference numeral 2 denotes a discharge arc tube (xenon tube), which is shaped like a straight and long cylinder and emits luminous fluxes. The discharge arc tube 2 is arranged so as to extend in a transverse direction of the illuminating device 1. Reference numeral 3 denotes a reflection umbrella that reflects components, which are emitted backward in a light emitting direction, among the luminous fluxes emitted from the discharge arc tube 2 forward in the light emitting direction. The inner surface of the reflection umbrella 3 is made of a metallic material such as bright aluminum having a high reflectance. It should noted that a metal having a high reflectance may be deposited on the inner surface of the reflection umbrella 3.

Reference numeral 4 denotes a light-permeable light guide member that divides the luminous fluxes emitted from the discharge arc tube 2 into luminous fluxes in some optical path regions, emits the luminous fluxes in the respective regions from an exit surface, and then causes the emitted luminous fluxes to intersect at predetermined intervals to change the light distribution characteristics so that the luminous fluxes can be distributed in a predetermined range.

Reference numeral 5 denotes a light-permeable optical member that receives the luminous fluxes emitted from the light-permeable light guide member 4 to change the light distribution characteristics so that the luminous fluxes can be distributed in a required predetermined range. A plurality of cylindrical lenses 5a, 5b, 5b' capable of refracting light vertically are formed in parallel juxtaposition in the vertical direction on a light exit surface of the optical member 5. Vertically extending prism sections (condensing sections) 5h, 5h' having total reflection inner surfaces are formed at the right and left side edges of the light-permeable optical member 5.

The discharge arc tube 2, the reflection umbrella 3 and the light guide member 4 are integrally held in a holding case, not shown, to constitute an emission unit. The emission unit is movable relative to the optical member 5 which is fixed to an outer surface of the illuminating device 1 according to the power changing operation of the lens barrel 12. This continuously changes the degree of convergence of illumination light. It should be noted that the light guide member 4 and the optical member 5 are preferably made of a resin material for optical use with a high light transmittance such as acryl resin or a glass material.

If a "strobe auto mode" is set in the camera that is constructed as described above, a central processing unit, not shown, determines whether to cause the illuminating device 1 to emit light according to the brightness of external light measured by the photometer, not shown, and the sensitivity of a loaded film after a user pressed the shutter release button 13.

Upon determining that it is necessary to cause the illuminating device 1 to emit light, the central processing unit outputs a light emission instruction to cause the discharge arc tube 2 to emit light via a trigger lead line, not shown, attached to the reflection umbrella 3. Luminous fluxes emitted in an illuminating direction among illuminating luminous fluxes emitted by the discharge arc tube 2 are directly transmitted through the light guide member 4 and the optical member 5, which are disposed in front of the discharge arc tube 2, to change the light distribution characteristics so that the luminous fluxes are distributed in a predetermined range. On the other hand, luminous fluxes emitted in an opposite direction to the illuminating direction among the illuminating luminous fluxes emitted by the discharge arc tube 2 are transmitted through the light guide member 4 and the optical member 5, which are disposed in front of the discharge arc tube 2, via the reflection umbrella 3 to change the light distribution characteristics so that the luminous fluxes are distributed in a predetermined range. The luminous fluxes are then radiated upon a subject.

The light distribution characteristics are changed only by the relative movement of the emission unit (i.e. the light guide member 4) and the optical member 5 along the axis of illumination light (i.e. the movement of the emission unit).

According to the present embodiment, if the taking lens of the camera is a zoom lens, the relative positions of the emission unit and the optical member 5 along the axis of illumination light are varied according to the focal length of the zoom lens. This enables simultaneous adjustment of the light distribution characteristics in both the transverse and vertical directions according to a required illumination range of the taking lens.

There will now be described the method of setting the optimum optical arrangement for changing the illumination range with reference to FIGS. 1 to 4.

Referring first to FIGS. 3 and 4, the basic principle of changing the illumination range in the diametric direction of the discharge tube (vertical direction) in the illuminating device 1 will be described. In FIGS. 3 and 4, elements and parts similar to those described with reference to FIG. 5 are denoted by the same reference numerals.

FIG. 3 shows a state in which the optical unit and the optical member 5 are arranged at the maximum interval. FIG. 4 shows a state in which the optical unit and the optical member 5 are arranged at the minimum interval. FIGS. 3 and 4 also show optical paths of typical light rays emitted from the center of the inner diameter of the discharge arc tube 2.

The illuminating device 1 described here is capable of continuously changing the illumination range while maintaining uniform longitudinal light distribution characteristics, and has an opening that is designed to have the minimum height.

FIGS. 3 and 4 show the inner and outer diameters of a glass portion of the discharge arc tube 2. A discharge arc tube for use in this kind of illuminating device usually emits light from the whole inner diameter so as to improve the efficiency. Thus, it may be considered that light is uniformly emitted from emission points over the whole inner diameter of the discharge arc tube 2. To simplify the explanation, however, light rays emitted from the center of the light source are considered as being typical light rays, and thus, the figures only show the typical light rays emitted from the center of the light source. The actual light distribution characteristics are changed such that the entire distribution of light becomes slightly wider due to luminous fluxes emitted from the periphery of the discharge arc tube 2 as well as the typical light rays shown in the figures, but the tendencies of the light distribution characteristics are substantially the same. Therefore, the following description will be made based on the typical light rays.

First, there will be sequentially described the characteristics of the illuminating optical system that is constructed as described above. The inner surface of the reflection umbrella 3 is semicylindrical and substantially concentric with the outer peripheral surface of the discharge arc tube 2. This enables light reflected by the reflection umbrella 3 to return to the vicinity of the center of the light source and prevents the light from badly affected by the refraction on the glass of the discharge arc tube 2. Moreover, this structure and arrangement of the reflection umbrella 3 is convenient since it enables the light reflected by the reflection umbrella 3 to be handled as emitted light that is substantially equivalent to direct light from the light source, and enables the reduction in size of the downstream optical system as a whole.

The reason why the reflection umbrella 3 is just semicylindrical is that if it is smaller, the light guide member 4 must be increased in size in order to converge light emitted toward the side and that if it is larger, the efficiency is lowered due to the increase in luminous fluxes inside the reflection umbrella 3.

According to the present embodiment, the light guide member 4 is constructed as described below. Cylindrical lenses providing a positive refracting power to both an entrance surface 4a and an exit surface 4b are formed at the center of the light guide member 4. Therefore, as shown in FIG. 3, a luminous flux emitted from the center of the discharge arc tube 2 is converged at a position P along a straight line extending vertically, i.e. perpendicularly to the plane of the figure.

In upper and lower sections of the light guide member 4, the luminous flux emitted from the center of the discharge arc tube 2 is refracted upon entrance surfaces 4c, 4c' and is then reflected by reflection surfaces 4d, 4d' to be emitted from exit surfaces 4e, 4e'. Among the rays of light reflected by the reflection surfaces 4d, 4d', the rays of light reflected at a front portion of the reflection surfaces 4d, 4d' are guided in such a direction as to get closer to the center of the exit optical axis, the rays of light reflected at the central portion are guided in substantially parallel to the exit optical axis, and the rays of light reflected at portions close to the light source are guided in such a direction as to go farther away from the center of the exit optical axis. The reflected luminous fluxes are distributed uniformly.

On the other hand, the three cylindrical lenses 5a, 5b, 5b' having a positive refracting power are formed side by side in the vertical direction on the exit surface of the optical member 5, as described previously. More specifically, as shown in the figures, the three cylindrical lenses 5a, 5b, 5b' are formed at locations corresponding to the following three areas: an area of convergence by the cylindrical lens formed at the center of the light guide member 4 and two upper and lower areas of convergence by total reflection surfaces.

The forms of the respective surfaces of the light guide member 4 will now be described in further detail. The cylindrical lenses formed on the entrance surface 4a and the exit surface 4b that control angular components close to the exit optical axis by direct refraction are aspherical lenses whose shapes are determined so that a luminous flux emitted from the center of the light source can be made parallel to the exit optical axis by the entrance surface 4a and then converged at the point P by the exit surface 4b.

This is intended to make it easier to set the optimum shape of the exit surface 4b by making the luminous flux refracted upon the entrance surface 4a parallel to the exit optical axis. However, the shapes of the cylindrical lenses should not necessarily be limited to such shapes as to make the luminous flux emitted from the center of the light source parallel to the exit optical axis by the entrance surface 4a. There is no particular limitation as to how to provide the lens surfaces with refracting power insofar as the luminous flux can be transmitted through the light guide member 4 and converged in the vicinity of the point P so that the maximum exit angle and the minimum exit angle can be equal to predetermined angles. Therefore, the use of aspherical lenses is not an essential condition; for example, a combination of a spherical lens and a cylindrical lens may be adopted.

There will now be described the shapes of the entrance surfaces 4c, 4c' that guide the incident light to the total reflection surfaces 4d, 4d' of the light guide member 4. The entrance surfaces 4c, 4c' are preferably parallel to the optical axis so as to minimize the size of the light guide member 4. More specifically, the luminous flux flowing in a different direction from the exit optical axis is refracted once by the entrance surfaces 4c, 4c'. As the angle of the entrance surfaces is smaller, the effect of the refraction increases so that the incident light can be guided due to the refraction in such a direction as to go farther from the optical axis. This reduces the total length of the optical prism.

Actually, however, the inclination of the entrance surfaces 4c, 4c' substantially depends on the conditions under which the light guide member 4 is formed. As the angle of the entrance surfaces 4c, 4c' is smaller, the actual forming conditions become more strict. Preferably, the maximum value $\Phi$ of the angle of the entrance surfaces is set within the following range irrespective of whether the entrance surfaces 4c, 4c' are flat or curved:

$$0 \leq \Phi < 2° \tag{1}$$

It seems to be difficult to set the angle within this range, but it is actually possible to set the angle within this range since the entrance surfaces 4c, 4c' are positioned at a short interval and they are flat and smooth. By determining the inclination of the entrance surfaces 4c, 4c' in this manner, it is possible to minimize the height of the opening without deteriorating the efficiency.

There will now be described the shape of the reflection surfaces 4d, 4d'. As stated previously, the shape of the reflection surfaces 4d, 4d' is determined such that among the rays of light reflected by the reflection surfaces 4d, 4d', the rays of light reflected at the front portion of the reflection surfaces 4d, 4d' are guided in such a direction as to get closer to the center of the exit optical axis, the rays of light reflected at the central portion are guided in substantially parallel to the exit optical axis, and the rays of light reflected at portions close to the light source are guided in such a direction as to go farther away from the center of the exit optical axis and that the reflected luminous fluxes are distributed uniformly.

As is the case with the entrance surface 4a and the exit surface 4b that control angular components close to the exit optical axis by direct refraction, the shape of the reflection surfaces 4d, 4d' is preferably determined so that the rays of light can be converged at one point. This increases the size of the light guide member 4 and the space required for changing the illumination range. This results in an increase in the size of the optical system as a whole in the illuminating device 1. Without increasing the size of the optical system, it is difficult to make the vertical illumination angles coincide and make the vertical light distribution characteristics uniform.

Therefore, according to the present embodiment, the shape of reflection surfaces 4d, 4d' is determined in such a manner as to achieve substantially the same effects as the above-mentioned one-point convergence. This makes it possible to achieve substantially the same effects as the entrance surface 4a and the exit surface 4b while keeping the light guide member 4 small in size.

On the other hand, although not illustrated, the luminous fluxes going backward along the exit optical axis among the luminous fluxes emitted from the discharge arc tube 2 are reflected by the reflection umbrella 3 and then enter again upon the discharge arc tube 2 to be guided forward along the exit optical axis via substantially the center of the discharge arc tube 2, because the reflection umbrella 3 is formed concentrically with the discharge arc tube 2. After returning to the center of the light source, the luminous fluxes are guided in the same manner as described above.

There will now be described the shape of the optical member 5. The optical member 5 is a flat member that can also be used as an outside member of the illuminating device 1 or the camera. Three lenses having positive refracting power are formed on the light exit surface of the optical member 5.

The lenses have such shapes as to change the degree of conversion of light emitted from a central area of convergence by the cylindrical lens with a positive refracting power and two upper and lower areas of convergence by total reflection surfaces as stated above with reference to the light guide member, at respective predetermined rates. The distribution of light is changed in the same manner in the three areas by adjusting the distance between the light guide member 4 and the optical member 5.

As shown in FIG. 3, the central lens among the three lenses is an aspherical lens configured such that the luminous flux emitted from the point P is refracted by the exit surface 5a of the optical member 5 into light rays substantially parallel to the exit optical axis. The upper and lower two lenses are formed as correction surfaces as described below since the luminous fluxes reflected by the total reflection surfaces 4d, 4d' of the light guide member 4 do not converge at one point.

More specifically, the surfaces of the upper and lower lenses are shaped so that the upper half and the lower half of each lens have different characteristics so as to make all the luminous fluxes transmitted through the exit surface parallel to the exit optical axis in the state in which the light guide member 4 and the optical member 5 are located at a predetermined interval.

This will now be described in further detail. In each lens, a part outside a component parallel to the exit optical axis in proximity to the center among all components of reflected light is comprised of a lens surface having a low refracting power, and a part inside the component is comprised of a lens surface having a high refracting power.

This arrangement achieves the maximum convergence in the vertical direction as shown in FIG. 3 in the state in which the light guide member 4 and the optical member 5 are located at a predetermined interval. In the maximum convergence, controlling the light by utilizing the opening of the optical member 5 to the utmost limit is an important condition for realizing an illuminating device that emits a large quantity of light. A small-sized illumination optical system with a high efficiency can be realized by satisfying this condition.

On the other hand, to achieve a light distribution characteristic in which the light is distributed in the widest range in the vertical direction, the light guide member 4 and the optical member 5 are positioned at the minimum interval as shown in FIG. 4. In this position, the positions of maximum convergence areas formed in front of the exit surfaces 4b, 4e, 4e' substantially correspond to positions of the respective exit optical axes of the lenses formed at the exit side of the optical member 5, i.e. the centers of the lenses as shown in the trace drawing showing the rays of light.

By making the maximum convergence areas obtained by the light guide member 4 substantially correspond to areas that are not greatly affected by the refracting power of the lenses in proximity to the centers of the optical axes of the lenses formed at the exit side of the optical member as stated above, it is possible to radiate the illuminating luminous fluxes on a subject with a light distribution characteristic that is substantially equivalent to the light distribution characteristic obtained in the case where the light is converged by the light guide member 4 alone.

More specifically, by arranging the optical system as stated above and properly setting a predetermined convergence by the light guide member 4 and the thickness of the optical member 5, it is possible to achieve a uniform light distribution characteristic with the widest illumination range, with a small loss, that corresponds to a required illumination area of the wide-angel taking lens. To achieve such a characteristic, the parts of the light guide member 4 are preferably shaped so that the convergences in the respective parts of the light guide member 4 can substantially correspond to one another.

Incidentally, the lens surface of the optical member 5 is formed at the exit side according to the present embodiment, and this is advantageous for reducing the size of the optical system of the illuminating device. Specifically, as the interval between the light source and a light control surface increases, the degree of convergence by refraction is higher. Thus, by arranging the light control plane at the farthest location in the optical system, the optical system of the illuminating device can be reduced in size along the exit optical axis.

Moreover, by arranging the optical system in the intermediate state between the state in FIG. 3 and the state in FIG. 4, it is possible to continuously change the effect of the refracting power of the cylindrical lenses 5a, 5b, 5b' by moving the same, i.e. changing the distance thereof relative to the optical system. It is therefore possible to change the light distribution characteristics according to the distance. By regulating the relative distance between the optical system and the cylindrical lenses, it is possible to change the light distribution characteristics continuously and uniformly.

Thus, it is possible to continuously change the light distribution characteristic in the vertical direction according to the change in the relative positions of the light guide member 4 and the optical member 5 along the exit optical axis.

Referring next to FIGS. 1 and 2, there will be described how the light distribution characteristic change along the axis of the discharge arc tube 2, i.e. in the longitudinal direction of the discharge arc tube 2.

FIG. 1 shows a state of the maximum convergence corresponding to FIG. 3, i.e. the state in which the light guide member 4 and the optical member 5 are located at the maximum distance. FIG. 2 shows a state of the widest illumination range corresponding to FIG. 4, i.e. the state in which the light guide member 4 and the optical member 5 are located at the minimum interval. In these figures, elements and parts similar to those described above are denoted by the same reference numerals, and these figures also show the typical luminous fluxes in order to explain the light distribution characteristicin the transverse direction.

First, there will be described the state shown in FIG. 1. As shown in the figure, no refracting plane such as a Fresnel lens for use in convergence is formed on the exit surfaces at the right and left of the optical member 5. This is because the width of an opening formed in the lateral direction of the optical member 5 is narrower than the effective arc length of the discharge arc tube 2 and there is only a short interval between the optical member 5 and the discharge arc tube 2. More specifically, if a sufficient distance cannot be ensured between the discharge arc tube 2 and the exit side of the optical member 5 located at the maximum distance apart from the light source, it is difficult to converge light since the angle at which the light source is seen from each point is excessively wide, even if any convergence plane is formed in the vicinity of the center.

For example, if a Fresnel lens is formed at the center of the optical member 5, luminous fluxes emitted from the center of the discharge arc tube 2 and its proximity can be converged, whereas luminous fluxes emitted from the ends of the discharge arc tube 2 cannot be satisfactorily converged since there is the high possibility that the illumination range is widened by refraction, the loss of light is caused by unexpected reflection resulting from the total reflection, and the loss of light is caused by refraction at the edge of the Fresnel lens. For this reason, lateral luminous fluxes are not converged at the exit side of the optical member 5 according to the present embodiment.

On the other hand, prism sections 5h, 5h' that are comprised of entrance surfaces 5e, 5e', total reflection surfaces 5d, 5d', and exit surfaces 5f, 5f' are formed at the periphery of the optical member 5 at a side toward the light source. The prism sections 5h, 5h' converge only lateral luminous fluxes. The reason why the prism sections 5h, 5h' are formed only at the periphery of the optical member 5 is that the angle at which the light source is seen from the periphery is narrower than at the center, the direction in which the light source is seen from the periphery can be limited to some degree, so that the directions of luminous fluxes can be controlled to some degree.

Therefore, according to the present embodiment, the shapes of the respective surfaces of the prism sections 5h, 5h' are optimized so as to achieve the maximum convergence as shown in FIG. 1. As shown in the figure, luminous fluxes incident upon the prism sections 5h, 5h' among luminous fluxes emitted from the vicinity of the right and left and the center of the light source are totally reflected to be made parallel with the exit optical axis.

Referring next to FIG. 2, there will now be described the widest illumination range in the transverse direction. It should be noted that FIG. 2 also shows luminous fluxes emitted in the same direction from the same point of the light source so that it can be compared with FIG. 1.

As stated above, no special refracting plane or reflecting plane for converging lateral luminous fluxes is formed at the exit side of the optical member 5. Thus, luminous fluxes incident upon a flat entrance section 5g are distributed uniformly over the wide range without narrowing the illumination angle in the transverse direction.

In further detail, as is clear from FIG. 2 showing the rays of light emitted from the center of the light source and its vicinity, if the light guide member 4 and the optical member 5 are arranged close to each other, all the rays of light emitted from the light guide member 4 can enter the flat incidence section 5g of the optical member 5. This prevents any component from entering the prism sections 5h, 5h' and achieves a light distribution characteristic with a wide illumination range.

Figure 7:
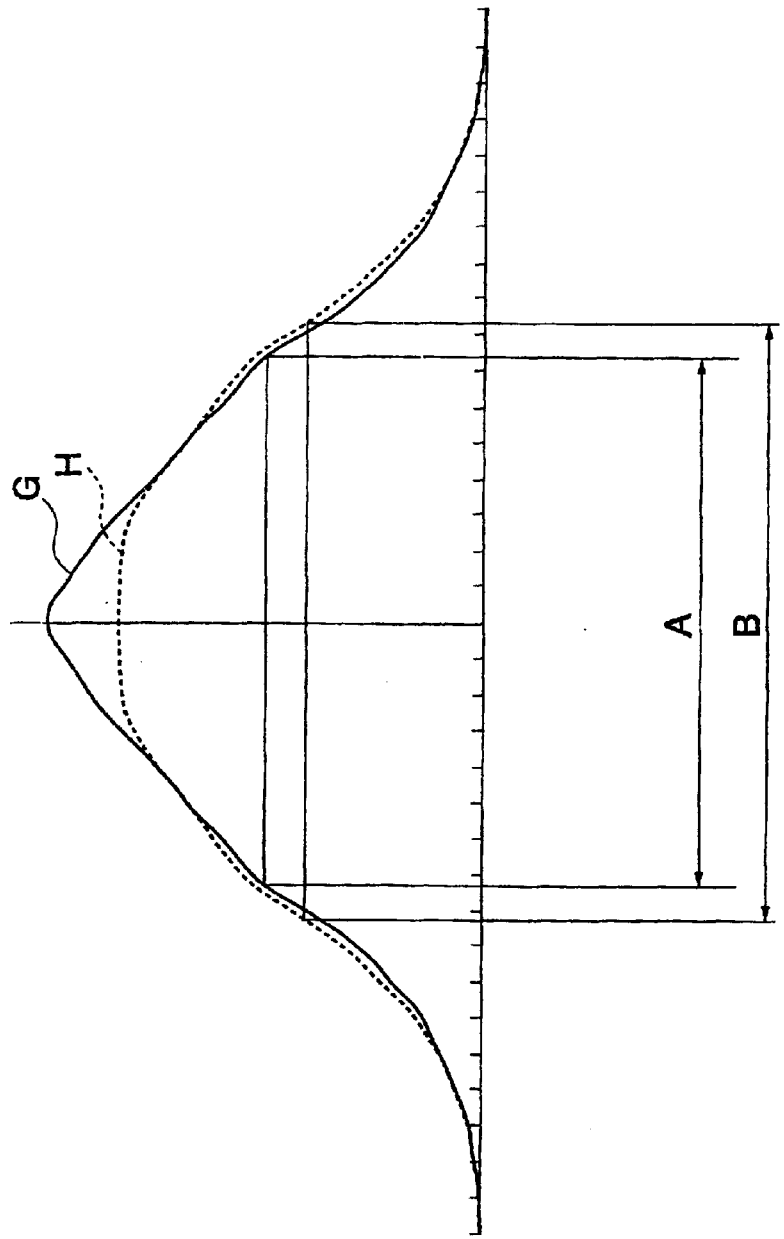
FIG. 7 is a diagram showing light distribution characteristics, the diagram being useful in explaining the illumination range of the illuminating device according to the first embodiment.

Referring next to FIG. 7, there will be described how the illumination range changes in the state shown in FIGS. 1 and 2.

In FIG. 7, the abscissa represents the angle with respect to the center, and the ordinate represents the quantity of light with respect to the angle. Here, character G indicates the convergence corresponding to the state in FIG. 1. In this state, the effective illumination range is equal to a range of angle A in which the quantity of light is equal to 50% of the quantity of light at the center.

On the other hand, symbol H indicates the wide illumination range corresponding to the state in FIG. 2, and the effective illumination range is equal to a range of angle B.

As is apparent from these figures, the convergence shown by symbol G indicates that the effective illumination range regulated to be 50% of the central quantity of light is relatively narrowed as a result of the increase in the quantity of light in the vicinity of the center by converging a part of luminous fluxes radiated toward the periphery, in the center and its vicinity.

Thus, if luminous fluxes emitted in such a direction as to go farther from the center of the exit axis (toward the left and right longitudinal ends of the optical member 5) among luminous fluxes emitted from the light guide member 4 enter the prism sections 5h, 5h' provided at the right and left of the optical member 5 to change the directions of the luminous fluxes in converging directions, the quantity of light in the vicinity of the center can be significantly increased and the quantity of light radiated outside of a required illumination range is reduced. This enables the efficient radiation of illumination light correspondingly to the long focal length of the taking lens.

On the other hand, if the optical system is arranged in the intermediate state between the state in FIG. 1 and the state in FIG. 2, the illumination range of illuminating luminous fluxes can be varied continuously by changing the relative positions of the light guide member 4 and the optical member 5. This is because the quantity of luminous fluxes directed to the center of the exit optical axis and its vicinity can be changed continuously according to the quantity of luminous fluxes incident upon the prism sections 5h, 5h' formed in the optical member 5 (the quantity of luminous fluxes reflected by the total reflection surfaces 5d, 5d') and that the effective illumination range in which the quantity of light is regulated to be 50% of the quantity of light in the vicinity of the center can be changed continuously by increasing or decreasing the luminous fluxes in the vicinity of the center.

More specifically, the quantity of light incident upon the prism sections 5h, 5h' is gradually increased from the state in FIG. 2, and this changes the direction of the luminous fluxes emitted toward the periphery so that the luminous fluxes can be directed to the vicinity of the center of the exit optical axis. It is therefore possible to continuously narrow the illumination range.

Although the respective surfaces of the prism sections 5h, 5h' are shaped so that the luminous fluxes emitted from the center of the light source can be totally reflected by the prism sections 5h, 5h' and emitted along the exit optical axis. It should be understood, however, that there is no intention to limit the present invention to it. For example, the respective planes of the prism sections 5h, 5h' may be shaped so that luminous fluxes emitted from the intermediate position between the center and periphery of the light source can be concentrated in the vicinity of the exit optical axis by the optical member 5. Alternatively, the respective reflection surfaces of the prism sections 5h, 5h' may be shaped arbitrarily so that preferable light distribution characteristics can be achieved at respective zooming points in view of an intermediate point of movement.

Thus, the optical system is able to change the illumination range in the transverse direction correspondingly to the change in the illumination range in the vertical direction shown in FIGS. 3 and 4. More specifically, a single action, that is, the relative movement of the optical unit and the optical member 5 along the exit optical axis enables a change in the illumination range in both vertical and transverse directions. This realizes an optical system with variable illumination range, which is very convenient because there is no need for an interlocking system and the illumination angle can be changed widely.

Further, since the total reflection surfaces 5d, 5d' are used to change the optical paths at the periphery in the lateral direction and the prism sections 5h, 5h' are formed to cover the both end portions of the exit surface of the light guide member in the longitudinal direction thereof, the illumination range can be changed efficiently with little loss of light caused by the change in the direction.

Further, according to the present embodiment, the illumination range in the transverse direction is changed by using the control planes (total reflection surfaces 5d, 5d') different from the light control planes that are used to change the illumination range in the vertical direction. Therefore, the illumination range can be changed separately in the transverse and vertical directions, and can be set freely in the transverse and vertical directions.

Although the above description is made by referring to the case where the reflection surfaces include the prism sections 5h, 5h' integrated with the optical member 5 are used as means for changing the illumination range in the transverse direction, but it is possible to use reflection surfaces such as bright aluminum integrated with the optical member or prism members provided separately from the optical member.

According to the present embodiment, the illumination range is changed by moving the converging section relative to the light source along the exit axis, but it should be understood that there is no intention to limit the present invention to it. The same effects can be achieved by arbitrarily controlling the directions of incident luminous fluxes by using an optical member that is capable of significantly changing the exit directions of the incident luminous fluxes (e.g. an optical fiber and a gradient index material with variable refractive index within the same member).

Figure 8:
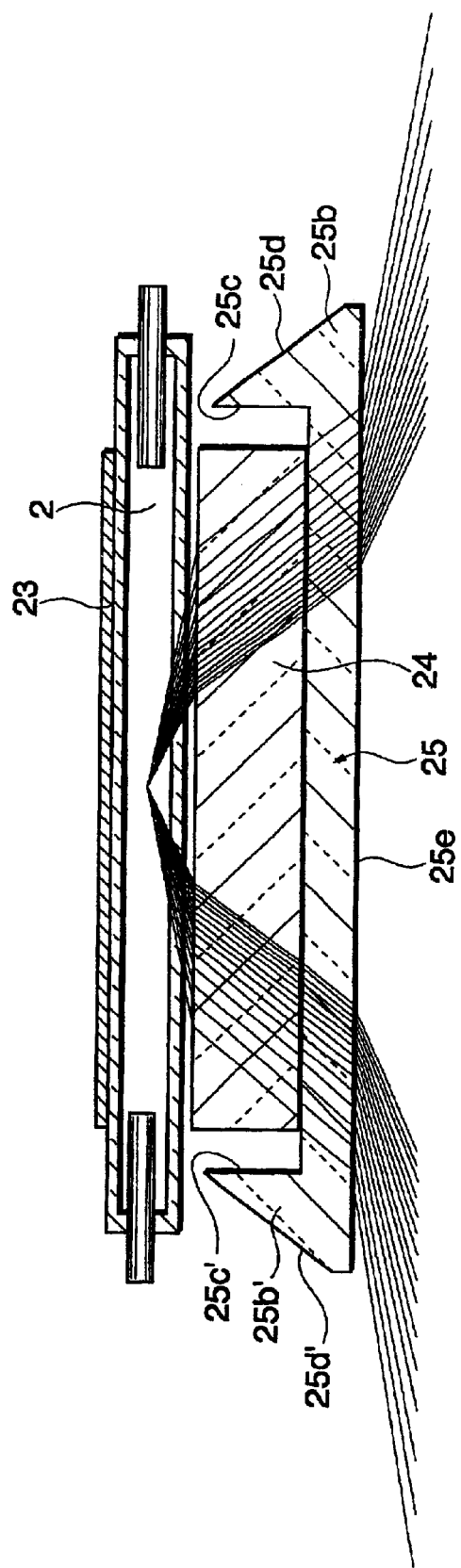
FIG. 8 is a horizontal longitudinal sectional view showing an illuminating device as a light emitting device according to a second embodiment of the present invention, which is in a narrow illumination range position, taken along the axis of a discharge tube.

FIGS. 8 to 13 show the optical arrangement of an illuminating device according to a second embodiment of the present invention. The present embodiment is different from the first embodiment in that the direction of relative movement of a light guide member 24 and an optical member 25 in changing the illumination range is reversed. More specifically, according to the present embodiment, the illumination range is widened to the utmost limit when the light guide member 24 and the optical member 25 are located at the maximum interval, and the illumination range is narrowed to the utmost limit when the light guide member 24 and the optical member 25 are located at the minimum interval. That is, luminous flux components emitted toward the outside of a required illumination range in FIG. 8 are utilized as peripheral components within a required angle of view to thus substantially widen the illumination range.

In the description of the present embodiment, elements and parts similar to those of the first embodiment are denoted by the same reference numerals. The illuminating device according to the present embodiment is also mounted in a camera as described with respect to the first embodiment.

Figure 9:
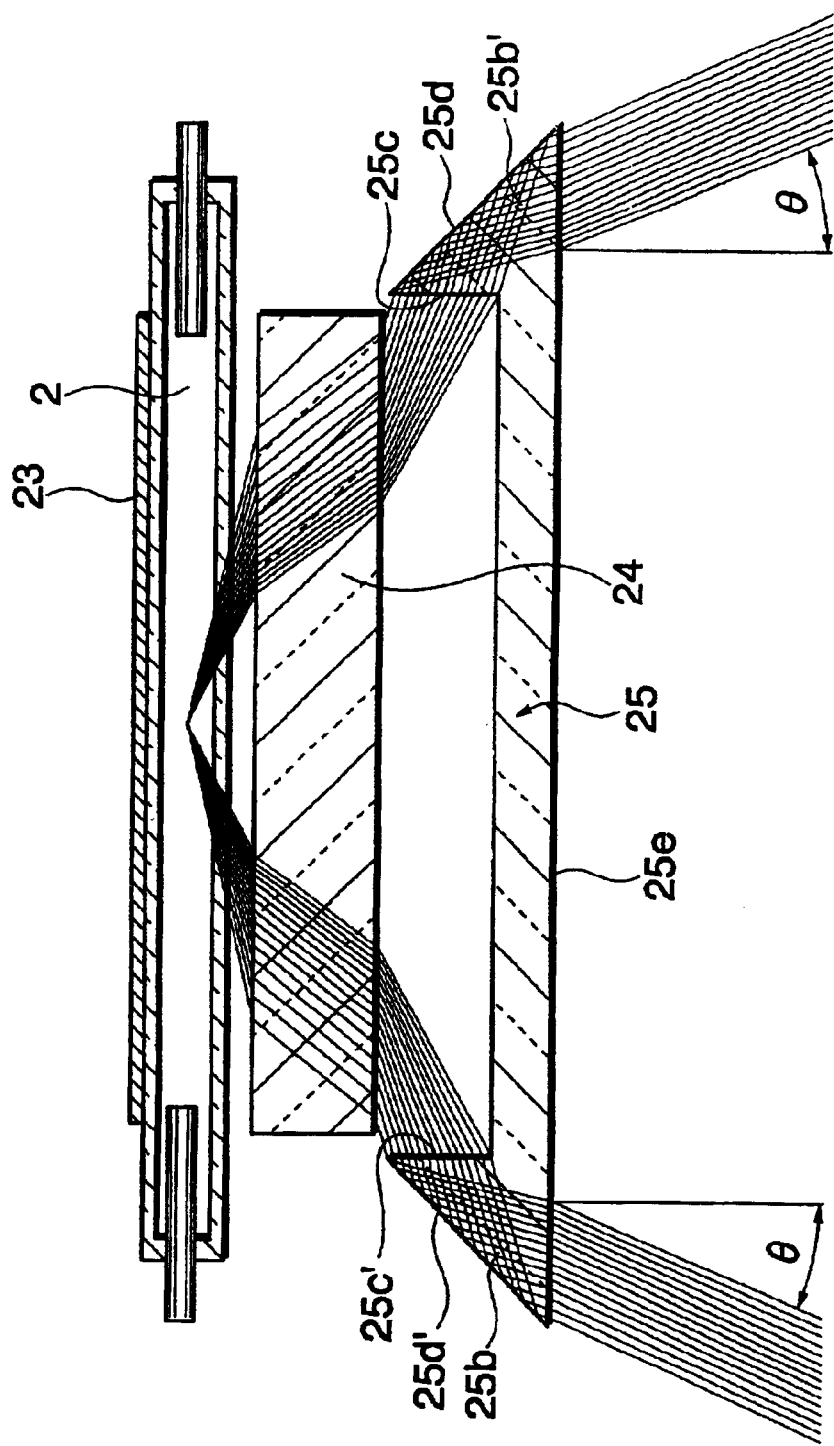
FIG. 9 is a horizontal longitudinal sectional view showing the illuminating device according to the second embodiment, which is in a wide illumination range position, taken along the axis of the discharge tube.
Figure 10:
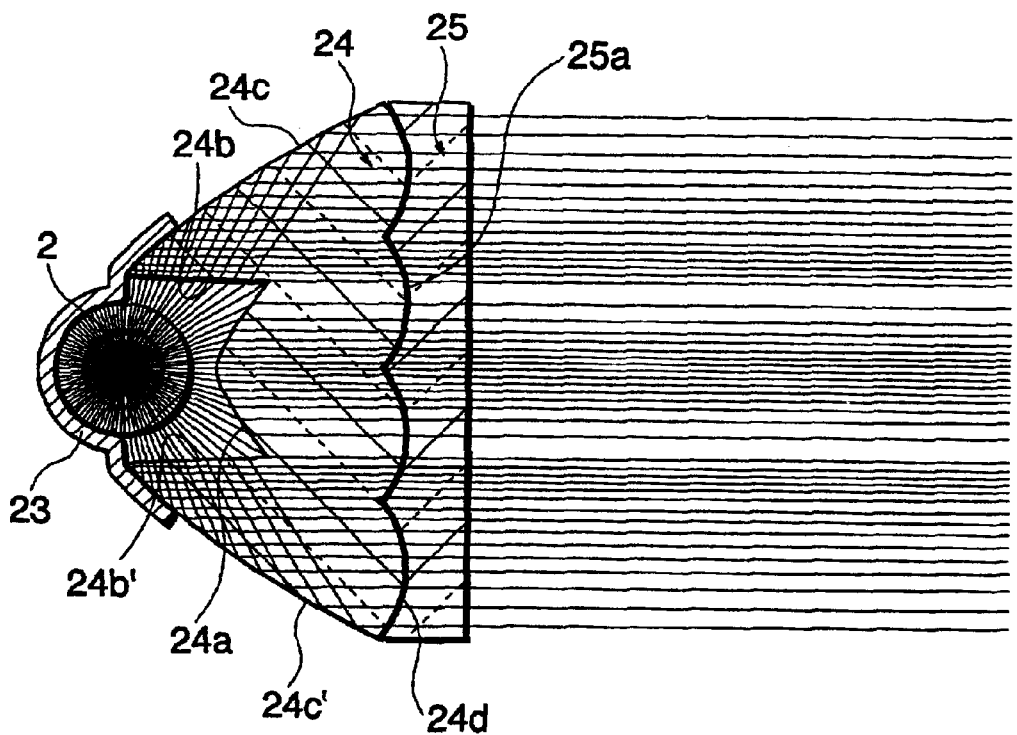
FIG. 10 is a vertical longitudinal sectional view showing the illuminating device according to the second embodiment, which is in a narrow illumination range position, taken in the diametric direction of the discharge tube.
Figure 11:
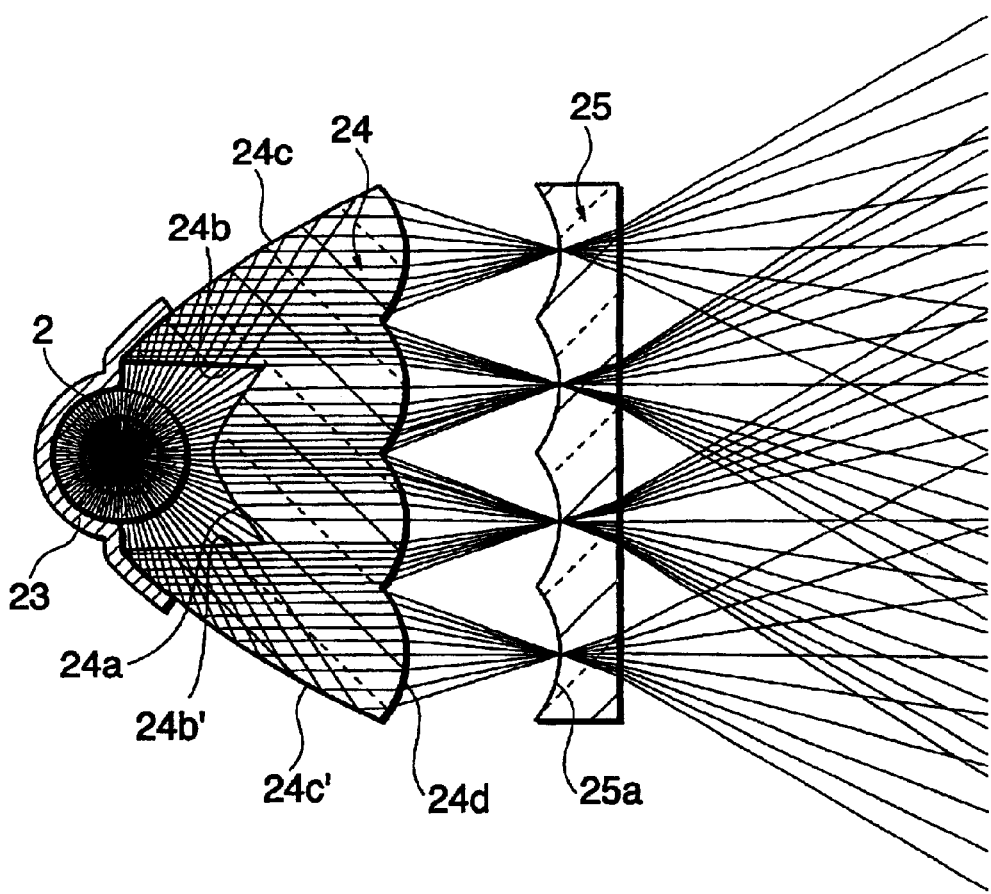
FIG. 11 is a vertical longitudinal sectional view showing the illuminating device according to the second embodiment, which is in a wide illumination range position, taken in the diametric direction of the discharge tube.
Figure 12:
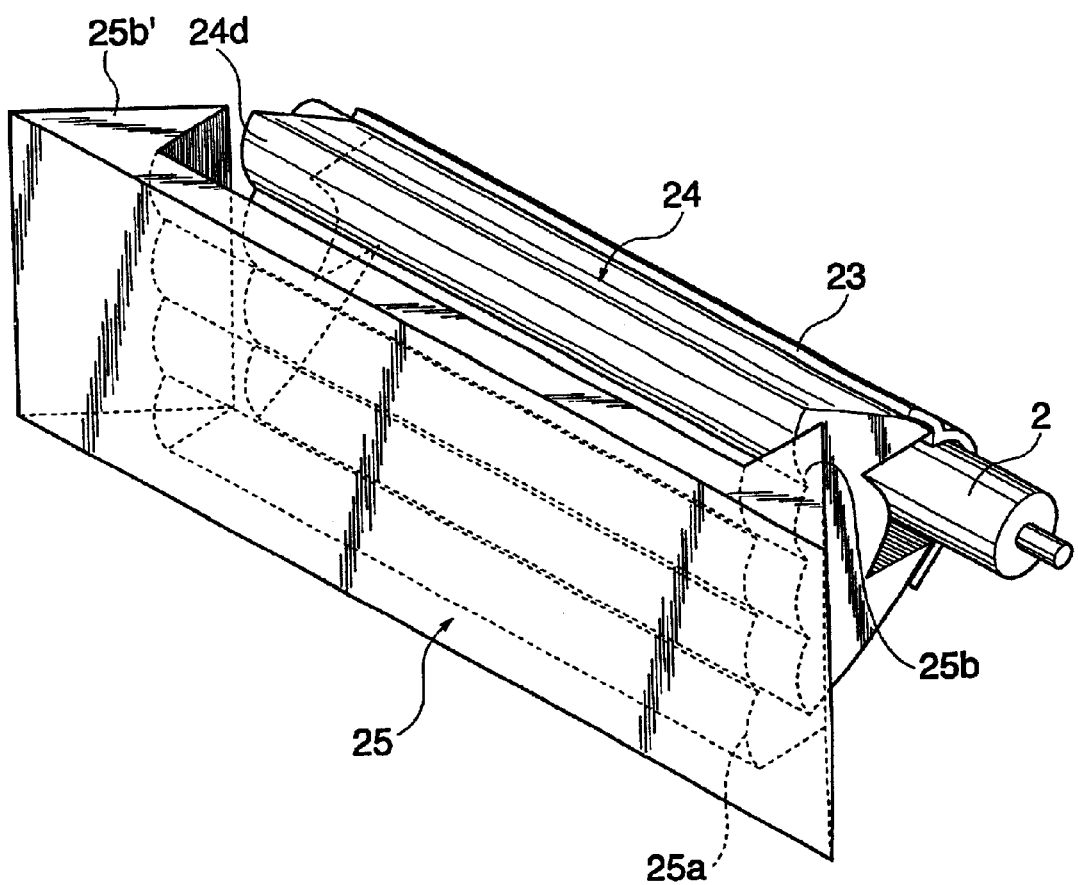
FIG. 12 is a perspective view showing essential parts of an optical system of the illuminating device according to the first embodiment.

FIGS. 10 and 11 are vertical longitudinal sectional views showing the center of the discharge arc tube 2 and its vicinity, and are also trace drawings showing the illuminating luminous fluxes emitted from the center of the discharge arc tube 2 and its vicinity. FIG. 12 is a perspective view showing essential parts of an illumination optical system according to the present embodiment. FIGS. 8 and 9 are sectional views showing the discharge arc tube 2 taken along the axis thereof, and they also show the typical light rays emitted from the center of the light source and its vicinity.

Referring to FIG. 12, a detailed description will now be given of components that specify the optical characteristics of the illuminating device according to the present embodiment.

In FIG. 12, reference numeral 23 denotes a reflection umbrella that reflects components, emitted backward in a light exit direction, forward in the light exit direction among luminous fluxes emitted from the discharge arc tube 2. The inner surface of the reflection umbrella 23 is made of a metallic material such as bright aluminum having a high reflectance. Incidentally, a metal having a high reflectance may be deposited on the inner surface.

Reference numeral 24 denotes a light guide member that divides the luminous fluxes emitted from the discharge arc tube 2 into luminous fluxes in some optical path regions, emits the luminous fluxes in the respective regions from an exit surface thereof, and then causes the luminous fluxes to intersect at predetermined intervals to to change the light distribution characteristic so that the luminous fluxes can be distributed in a predetermined range.

Reference numeral 25 denotes an optical member that receives the luminous fluxes emitted from the light-permeable light guide member 24 to achieve a predetermined light distribution characteristic. A plurality of cylindrical lenses 25a, which have a negative refracting power to act in the vertical direction, are formed in parallel in the vertical direction on an entrance surface of the optical member 5.

Vertically extending prism sections (converging sections) 25b, 25b' that totally reflect incident light are formed at the right and left peripheries of the optical member 25.

With this arrangement, the discharge arc tube 2, the reflection umbrella 23 and the light guide member 24 are integrally held in a holding case, not shown, to constitute an emission unit. The emission unit is moved relative to the optical member 25 fixed on the external surface of the illuminating device. This continuously changes the degree of convergence of illumination light. It should be noted that the light guide member 24 and the optical member 25 are preferably made of a resin material for optical use with a high light transmittance such as acryl resin or a glass material.

According to the present embodiment, if a zoom lens is used as a taking lens of the camera, the relative positions of the light guide member 24 and the optical member 25 along the axis of illumination light are varied according to the focal length of the zoom lens. This enables the light distribution characteristic in the vertical direction to change correspondingly to the angle of view of the taking lens, and enables the light distribution characteristic in the transverse direction, in which luminous fluxes are essentially difficult to control due to the excessively large size of the effective light source, to change correspondingly to the angle of view of the taking lens without using any other members.

There will now be described the method of setting the optimum optical arrangement for changing the illumination range with reference to FIGS. 8 to 11.

FIGS. 10 and 11 are vertical longitudinal sectional views showing the discharge arc tube 2 in the diametric direction thereof in the illuminating device according to the present embodiment to describe the basic principle of changing the illumination range in the vertical direction. In these figures, elements and parts similar to those described with reference to FIG. 12 are denoted by the same reference numerals. FIG. 10 shows the state in which the light guide member 24 and the optical member 25 are located at the minimum interval, and FIG. 11 shows the state in which the light guide member 24 and the optical member 5 are located at the maximum interval. FIGS. 10 and 11 also show optical paths of light emitted from the center of the inner diameter of the discharge arc tube 2.

According to the present embodiment, it is possible to continuously change the illumination range while maintaining the uniform light distribution characteristic in the vertical direction, and a vertical opening is formed to have the minimum height.

First, there will be sequentially described the characteristics of the optical system that is constructed as described above described. The inner surface of the reflection umbrella 23 is semicylindrical and substantially concentric with the discharge arc tube 2 for the same reasons as in the first embodiment.

On the other hand, the upper and lower peripheries of the reflection umbrella 23 are formed along the back of the light guide member 24 for the reasons stated below.

Luminous fluxes emitted from the center of the light source are ideally reflected by reflection surfaces 24c, 24c' formed on the inner surface of the light guide member 24 as shown in the figures, but luminous fluxes emitted from the right side of the center of the light source in the figures are partially emitted from the reflection surfaces 24c, 24c' particularly if the light source has a large inner diameter. The upper and lower peripheries of the reflection umbrella 23 are shaped to cover the back of the light guide member 24 in order to effectively utilize such luminous fluxes emitted from the reflection surfaces 24c, 24c'. More specifically, the reflection umbrella 23 is extended to the back of the light guide member 24, and is formed correspondingly to the shapes of the reflection surfaces 24c, 24c'. This enables the luminous fluxes, which are emitted from the reflection surfaces 24c, 24c' without being reflected by the reflection surfaces 24c, 24c', to enter again the light guide member 24. Therefore, the reflected luminous fluxes can be converged efficiently in a predetermined illumination range.

According to the present embodiment, the light guide member 24 is shaped as described below.

In the central section of the light guide member 24 in the vertical direction, a cylindrical lens is formed on the entrance surface 24a to provide a positive refracting power, so that luminous fluxes emitted from the center of the light source can be made parallel with the exit optical axis.

Likewise, in the upper and lower sections of the light guide member 24, luminous fluxes emitted from the center of the light source are refracted by the entrance surfaces 24b, 24b' and are reflected by the total reflection surfaces 24c, 24c' located at the upper and lower sides of the entrance surfaces 24b, 24b' so that the luminous fluxes can be made parallel with the exit optical axis.

After the luminous fluxes emitted from the center of the light source are once made parallel with the exit optical axis in the above-mentioned manner, a plurality of cylindrical lenses 24c having a positive refracting power formed on the exit surface 24d forms a plurality of convergence areas as shown in FIG. 11.

On the other hand, a plurality of cylindrical lenses 25a, which have such a negative refracting power as to offset the power of the cylindrical lenses 24d formed on the exit surface of the light guide member 24, are formed on the entrance surface of the optical member 25.

With this arrangement, the refracting power of the cylindrical lenses is offset when the light guide member 24 and the optical member 25 are close to each other as shown in FIG. 10. This maintains the convergence state in which the luminous fluxes are reflected by the reflection surfaces 24c, 24c' after they are refracted by the entrance surface 24a of the light guide member 24 or refracted by the entrance surfaces 24b, 24b'.

On the other hand, when the light guide member 24 and the optical member 25 are located at the maximum interval as shown in FIG. 11, the light distribution characteristics can be changed so that the luminous fluxes can be distributed uniformly in a predetermined range. This is because the luminous fluxes of the respective sections converged by the cylindrical lens 24d of the light guide member 24 are transmitted through the center of the cylindrical lens 25a and its vicinity with a low refracting power in the optical member 25. Such arrangement of the optical system reduces the effect produced by the cylindrical lens 25a on the luminous fluxes.

Moreover, when the optical system is arranged in the intermediate state between the state in FIG. 10 and FIG. 12, it is possible to continuously change the effect produced by the refracting power of the cylindrical lens 25a with movement of the light guide member 24, i.e. change in the distance thereof relative to the optical system. Therefore, the light distribution characteristics can also be changed according to change in the distance of the light guide member 24. By regulating the relative positions of the light guide member 24 and the optical system, it is possible to continuously and uniformly change the light-distribution characteristics.

Thus, it is possible to continuously change the light distribution characteristic in the vertical direction according to change in the relative positions of the light guide member 24 and the optical member 25 along the exit optical axis.

Referring next to FIGS. 8 and 9, there will be described a change in the light distribution characteristic in the transverse direction. These figures are horizontal longitudinal sectional views including a central axis of the discharge arc tube 2. FIG. 8 shows the narrowest illumination range corresponding to FIG. 10, i.e. the state in which the light guide member 24 and the optical member 25 are located at the minimum interval. FIG. 10 shows the widest illumination range corresponding to FIG. 11, i.e. the state in which the light guide member 24 and the optical member 25 are located at the maximum interval. In these figures, elements and parts similar to those described above are denoted by the same reference numerals, and these figures also show the typical luminous fluxes emitted from the center of the light source in order to explain the light distribution characteristic in the transverse direction.

As illustrated in the figures, the exit surfaces at the right and left peripheries of the optical member 25 are designed to be flat for the same reasons as in the first embodiment. Specifically, since the optical member 25 is close to the light source and the light source is longer than the opening in the optical member 25, it is difficult to converge light since the angle at which the light source is seen from each point is excessively wide even if any convergence plane is formed.

On the other hand, prism sections 25b, 25b' that converge only lateral luminous fluxes are formed at the right and left peripheries of the optical member 25.

The reason why the prism sections 25b, 25b' are formed only at the right and left peripheries of the optical member 25 is that the angle at which the light source is seen from the periphery is narrower than at the center and the direction in which the light source is seen from the periphery is limited to some degree, so that the directions of luminous fluxes can be controlled to a certain extent.

As is apparent from the trace drawing, the luminous fluxes emitted from the center of the light source cannot be converged in the state shown in FIG. 8, and the same rays of light as those emitted form the center of the light source in FIG. 8 enter the prism sections 25b, 25b' so that the rays of light are deflected into a predetermined exit direction.

This will now be described in further detail. The prism sections 25b, 25b' are comprised of flat entrance surfaces 25c, 25c'; aspherical total reflection surfaces 25d, 25d'; and the right and left peripheries of a flat exit surface 25e.

As is apparent from the trace drawing of FIG. 9, the entrance surfaces 25c, 25c' are flat so that they can be substantially vertical to the exit optical axis in order to increase the quantity of incidence light and minimize the size thereof.

The total reflection surfaces 25d, 25d' are aspherical and extend vertically, i.e. perpendicularly to the plane of the figure so that the luminous fluxes emitted from the exit surface 25e can be reflected at a predetermined angle θ.

The illumination angle in the lateral direction can be widened by a predetermined degree by forming the prism sections 25b, 25b' in the above-mentioned manner. The principle of changing the illumination angle in the state shown in FIGS. 8 and 9 will now be described with reference to FIG. 13.

Figure 13:
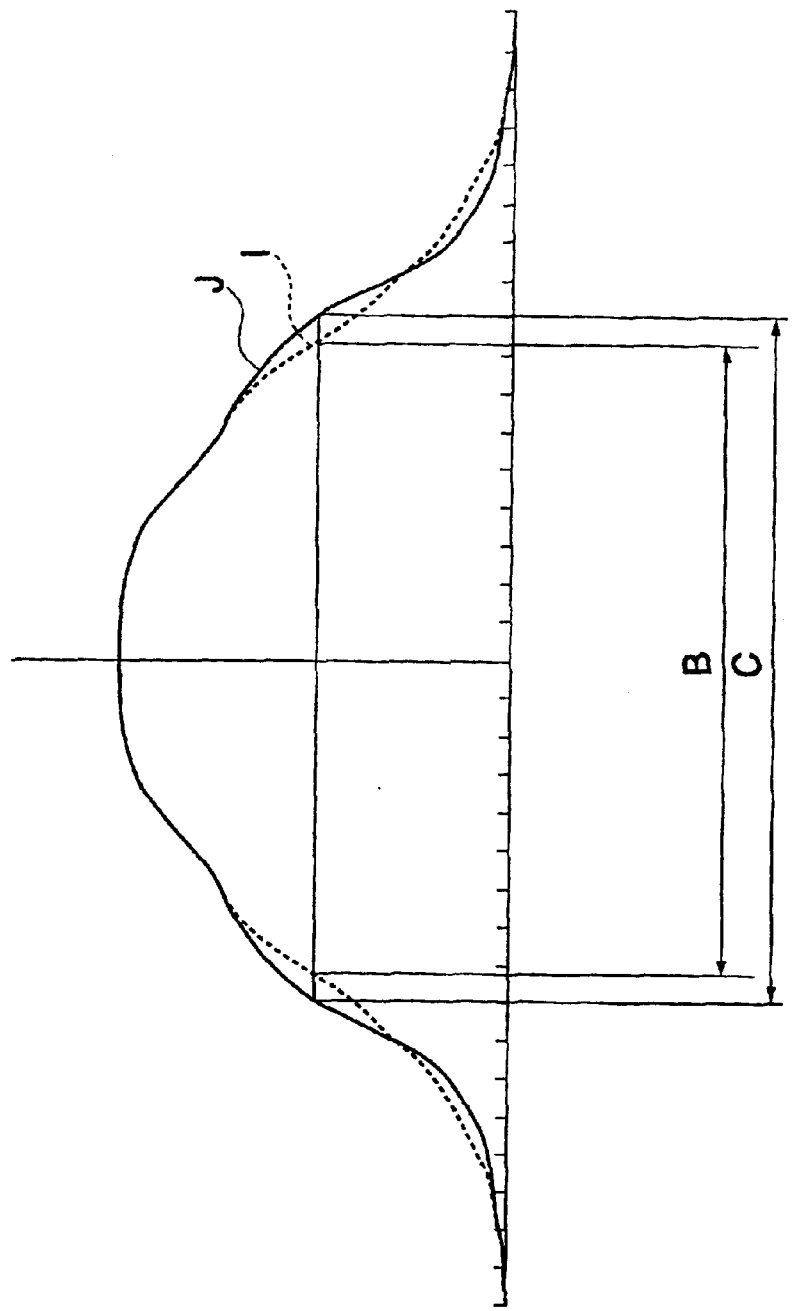
FIG. 13 is a diagram showing light distribution characteristics, the diagram being useful in explaining the illumination range of the illuminating device according to the second embodiment.

In FIG. 13, the abscissa represents the angle with respect to the center, and the ordinate represents the quantity of light with respect to the angle. Here, character I indicates the convergence corresponding to the state of FIG. 8. In this state, the effective illumination range is equal to a range of angle B in which the quantity of light is equal to 50% of the quantity of light at the center. In this state, the luminous fluxes at the right and left peripheries cannot be utilized effectively.

On the other hand, character J indicates the wide illumination range corresponding to the state of FIG. 9, in which the effective illumination range is equal to a range of angle C. As is apparent from the figure, the character I indicates the state in which the illumination range is widened by directing a part of luminous fluxes, radiated toward the right and left peripheries, to the periphery of a required illumination range so that the quantity of light at the periphery can be equal to about 50% of the quantity of light at the center.

Thus, the luminous fluxes that may be controlled by the prism sections 25b, 25b' can be used for changing the effective illumination range in the illumination optical system that widens only the angular components within a narrow area in which the quantity of light is equal to 50% of the quantity of light at the center since it is possible to quite correctly control the direction in which the rays of light (although the absolute quantity thereof is small) emitted from a small gap with the relative movement of the light guide member 24 and the optical member 25.

This method reduces the quantity of light radiated outside of a required illumination range to enable the efficient adjustment of the illumination range corresponding to the focal length of the taking lens.

According to the present embodiment, all the luminous fluxes emitted from the center of the light source are deflected at the predetermined angle θ by the prism sections 25b, 25b', but there is no intention to limit the invention to it. For example, in the prism sections, the reflection surfaces may be arbitrarily shaped insofar as the quantity of light in the vicinity of the periphery of the required illumination range can be increased. The same effects as in the present embodiment can be achieved by optimizing the shape of the reflection surfaces.

Further, according to the present embodiment, a straight discharge arc tube is used as the light source, but such discharge arc tube should not necessarily be used as the light source. It is possible to use a light source (e.g. cold-cathode tube) that has an effective light emitting part that extends to such a degree that the light source cannot be regarded as a point light source.

Figure 14:
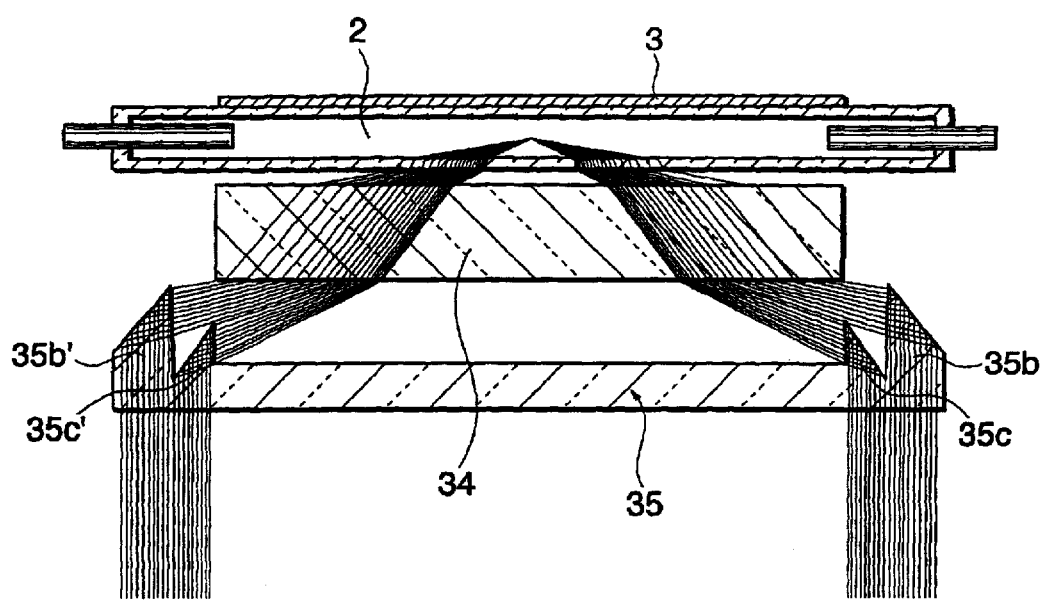
FIG. 14 is a horizontal longitudinal sectional view showing an illuminating device as a light emitting device according to a third embodiment of the present invention, which is in a narrow illumination range position, taken along the axis of a discharge tube.
Figure 15:
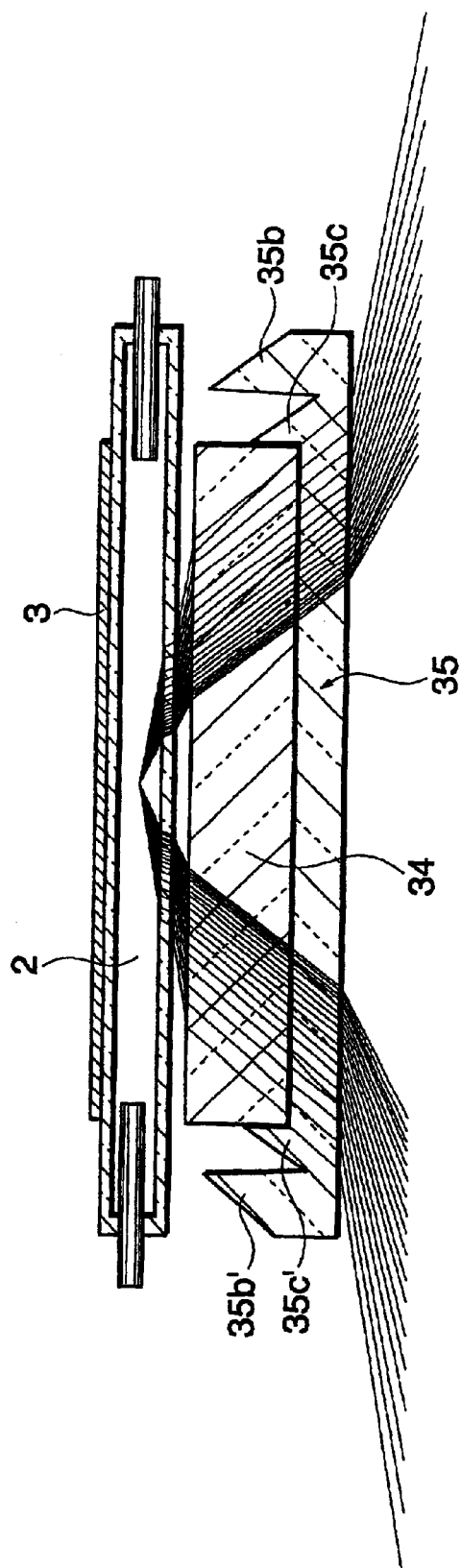
FIG. 15 is a horizontal longitudinal sectional view showing the illuminating device according to the third embodiment, which is in a wide illumination range position, taken along the axis of the discharge tube.

FIGS. 14 and 15 show the optical arrangement of an illuminating device according to a third embodiment of the present invention. The present embodiment is different from the first embodiment in the shape of a part of an optical member 35. In particular, the present embodiment is characterized in that the respective prism sections provided at the right and left peripheries of the optical member 35 are divided into a plurality of parts to form prism rows.

In the description of the present embodiment, elements and parts similar to those of the first embodiment are denoted by the same reference numerals. The illuminating device according to the present embodiment is also mounted in a camera as described with respect to the first embodiment.

Further, the illumination range in the vertical direction, i.e. in the diametric direction of the discharge arc tube 2 is changed in the same manner as in FIGS. 3 and 4.

In FIGS. 14 and 15, reference numeral 34 denotes a light guide member which luminous fluxes emitted from the discharge arc tube 2 enter and which changes the light distribution characteristics so that the luminous fluxes can be distributed in a predetermined range. Reference numeral 25 denotes an optical member which the luminous fluxes emitted from the light guide member 34 enter to achieve a predetermined light distribution characteristic. Prism rows comprised of prism sections 35b, 35c, 35b', 35c' are formed at the right and left sides of the exit surface of the optical member 35.

FIG. 14 shows the state in which the illumination range is narrowed to the utmost limit by arranging the light guide member 34 and the optical member 35 at the maximum interval, and FIG. 15 shows the state in which the illumination range is widened to the utmost limit by arranging the light guide member 34 and the optical member 35 at the minimum interval. FIGS. 14 and 15 also show the traces of typical luminous fluxes emitted from the center of the discharge arc tube 2 and its vicinity. It should be noted that the discharge arc tube 2 and the reflection umbrella 3 are the same as in the first embodiment.

The convergence in the vertical direction in the state shown in FIG. 14 is the same as in the first embodiment shown in FIG. 3. The convergence in the vertical direction in the state shown in FIG. 15 is the same as in the first embodiment shown in FIG. 4.

There will now be described the operation of the illuminating device according to the present embodiment. In the state shown in FIG. 14, among luminous fluxes emitted from the center of the discharge arc tube 2 and its vicinity, the luminous fluxes incident on the prism rows 35b, 35b', 35c, 35c', which are formed at both ends of the optical member 35 in such positions as to face the light source, are deflected by total reflection surfaces of the prism rows 35b, 35b', 35c, 35c'. This increases the luminous fluxes going toward the exit optical axis. It is therefore possible to increase the quantity of light at the center to a larger extent than in the case where the total reflection surfaces are formed to be flat.

According to the present embodiment, the illuminating luminous fluxes emitted from the light guide member 34 are refracted for convergence by reflection by a plurality of prism rows, which are formed at the right and left ends of the optical member 35 in such positions to face the light source optical and extend in the vertical direction, i.e. perpendicularly to the plane of the figures. Thus, even with the arrangement that the prism section is divided into a plurality of parts, substantially the same convergence effects can be achieved as in the first embodiment shown in FIG. 1.

In the state of FIG. 15, the luminous fluxes emitted from the light guide member 34 immediately enter the optical member 35 without passing the prism sections 35b, 35b', 35c, 35c' formed at the right and left peripheries. Therefore, the luminous fluxes emitted form the discharge arc tube 2 from the same exit point and in the same exit direction as the rays of light shown in FIG. 14 are not converged. This achieves a light distribution characteristic in which the luminous fluxes are distributed in a wide range.

Although the prism sections are formed in two rows at the right side and two rows at the left side as reflecting sections that cause the optical member 35 to converge the luminous fluxes, but there is no intention to limit the invention to it. For example, the prism sections may be formed in three or more rows. Moreover, the transverse area of the opening may be increased to reduce the degree of projection of prism sections so that they can be more flat.

Further, the prism section controls the illuminating direction by making the luminous fluxes emitted from the center of the light source parallel to the exit optical axis when the light guide member 34 and the optical member 35 are positioned apart at the maximum distance. It should be understood, however, that there is no intention to limit the invention to it. The same effects as those of the present embodiment can be achieved insofar as the prism section is capable of capturing the luminous fluxes flowing toward the right and left peripheries and making them closer to the exit optical axis when the light guide member and the optical member are apart from each other.

Further, according to the present embodiment, the prism rows formed on the exit surface of the optical member 35 extend in the direction vertical or perpendicular to the plane of the figures, but there is no intention to limit the invention to it.

For example, it is possible to use prism rows that are inclined at a predetermined angle or orbicular prism rows that are concentric with one another.

Figure 16:
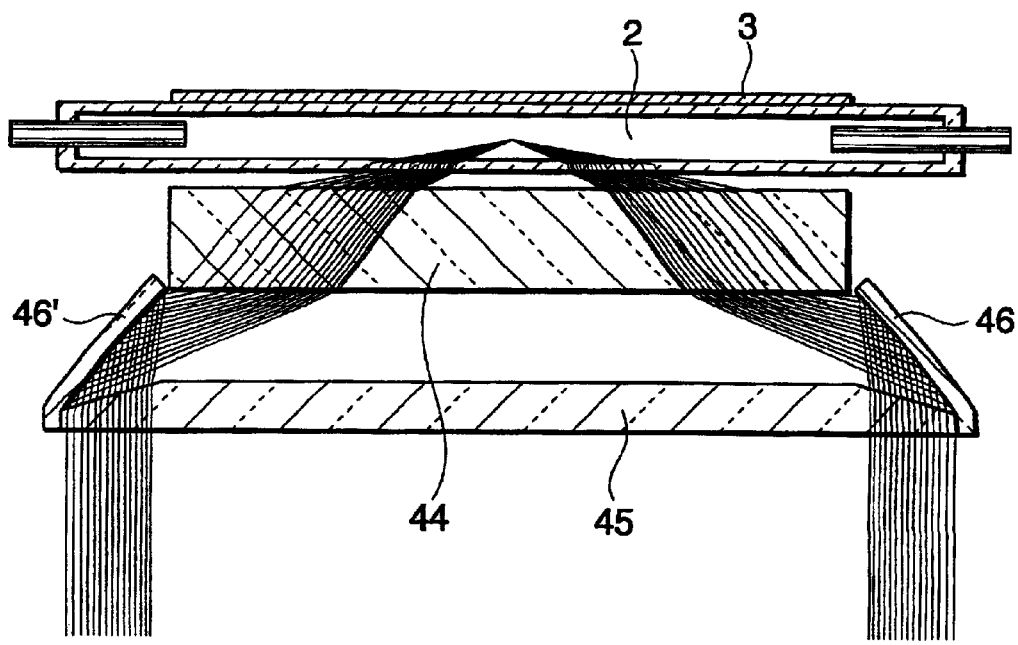
FIG. 16 is a horizontal longitudinal sectional view showing the illuminating device according to the third embodiment, which is in a narrow illumination range position, taken in the diametric direction of the discharge tube.
Figure 17:
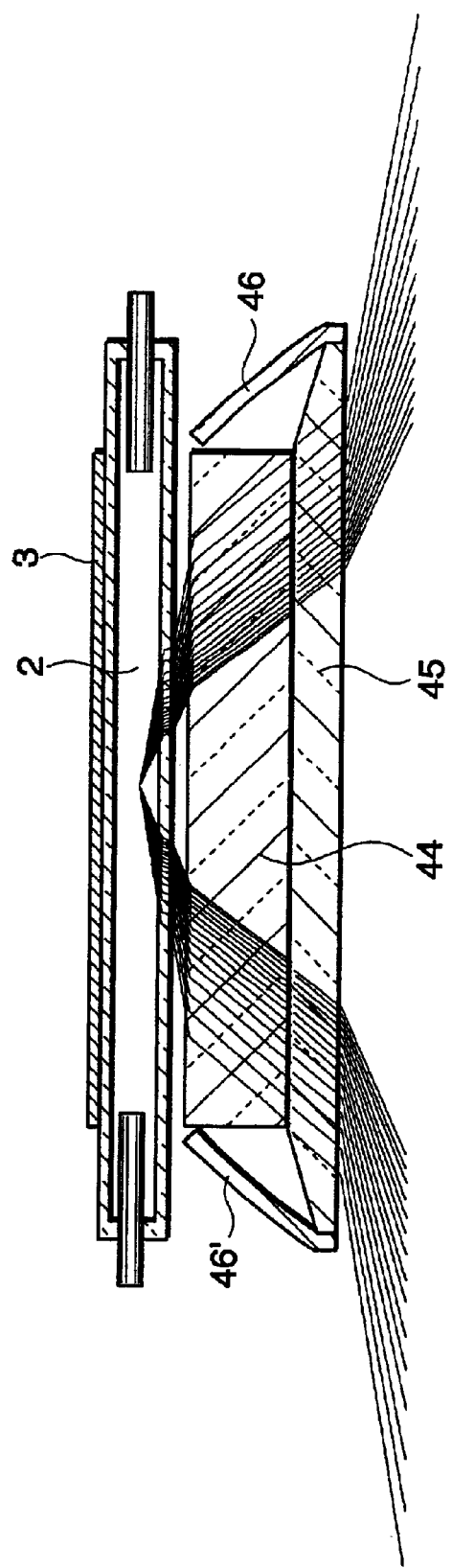
FIG. 17 is a horizontal longitudinal sectional view showing the illuminating device according to the third embodiment, which is in a wide illumination range position, taken in the diametric direction of the discharge tube.

FIGS. 16 and 17 show the optical arrangement of an illuminating device according to a fourth embodiment of the present. The present embodiment is different from the first embodiment that an optical member 45 is partially modified differently from the third embodiment. In particular, the present embodiment is characterized in that reflecting members 46 (reflecting boards 46), which are formed of separate members from the optical member 45, are attached integrally to the right and left peripheries of the optical member 45.

In the description of the present embodiment, elements and parts similar to those in the first embodiment are denoted by the same reference numerals. The illuminating device of the present embodiment is also mounted in a camera as described with respect to the first embodiment.

The illumination range in the vertical direction, i.e. in the diametric direction of the discharge arc tube 2 is changed in the same manner as in FIGS. 3 and 4.

In FIGS. 16 and 17, reference numeral 44 denotes a light guide member which luminous fluxes emitted from the discharge arc tube 2 enter and which changes the light distribution characteristics so that the luminous fluxes can be distributed along a predetermined width. Reference numeral 45 denotes an optical member which the luminous fluxes emitted from the light guide member enter to achieve a predetermined light distribution characteristic. Reference numerals 46, 46' denote reflecting boards attached integrally to the optical member 45.

FIG. 16 shows a state in which the illumination range is narrowed to the utmost limit by arranging the light guide member 44 and the optical member 45 at the minimum interval, and FIG. 17 shows a state in which the illumination range is widened to the utmost limit by arranging the light guide member 44 and the optical member 45 at the maximum interval. FIGS. 16 and 17 also show the traces of typical luminous fluxes emitted from the center of the discharge arc tube 2 and its vicinity. It should be noted that the discharge arc tube 2 and the reflection umbrella 3 are the same as in the first embodiment.

In the state shown in FIG. 16, the convergence of luminous fluxes in the vertical direction is the same as in the first embodiment shown in FIG. 3. In the state shown in FIG. 17, the convergence of luminous fluxes in the vertical direction is the same as in the first embodiment shown in FIG. 4.

There will now be described the operation of the illuminating device according to the present embodiment. In the state shown in FIG. 16, among luminous fluxes emitted from the center of the discharge arc tube 2 and its vicinity, the luminous fluxes incident on the reflection boards 46, 46', which are attached to both ends of the optical member 34 in such positions as to face the light source, are deflected by reflection surfaces formed as aspherical curved surfaces on the reflecting boards 46, 46'. This increases the luminous flux components flowing toward the exit optical axis. It is therefore possible to increase the quantity of light at the center to a larger extent than in the case where the total reflection surfaces are formed in flat planes.

According to the present embodiment, the illuminating luminous fluxes emitted from the light guide member 44 are refracted for convergence by reflection by the reflecting boards 46, 46', which are provided at the right and left ends of the optical member 45 in such a manner as to fact the light source and extend in the vertical direction which is perpendicular to the plane of the figures. Thus, by using the reflecting members, substantially the same convergence effects can be achieved as in the first embodiment shown in FIG. 1.

In the state of FIG. 17, the luminous fluxes emitted from the light guide member 44 immediately enter the optical member 45 without passing the reflecting boards 46, 46' provided at the right and left peripheries. Therefore, the luminous fluxes emitted form the discharge arc tube 2 in the same exit direction from the same exit point as the rays of light shown in FIG. 16 are not converged. This achieves a light distribution characteristic in which the luminous fluxes are distributed in a wide range.

According to the present embodiment, aspherical reflecting curved surfaces extending in the vertical direction which is perpendicular to the plane of the figures are formed on the reflecting members that cause the optical member to converge the luminous fluxes, so that the luminous fluxes emitted from the center of the light source are deflected to become parallel with the exit optical axis. It should be understood, however, that there is no intention to limit the shape of the reflecting members to the above-mentioned shape. The same effects as in the present embodiment can be achieved insofar as the reflection boards are shaped such that they are capable of capturing the luminous fluxes flowing toward the right and left peripheries and making them closer to the exit optical axis when the light guide member and the optical member are apart from each other.

According to the present embodiment, the reflecting members are used to capture the luminous fluxes radiated through a gap between the light guide member 44 and the second optical member 45 toward the side to change the illuminating direction. This achieves substantially the same effects as in the embodiments described previously except that the luminous fluxes falling upon the right and left peripheries of the optical member 45 directly from the light guide member 44 cannot be controlled and hence a part of the rays of light cannot be utilized effectively and that the quantity of light may be reduced according to the reflectance of the reflecting members. As is the case with the embodiments described previously, the present embodiment enables the capture of luminous fluxes that cannot be utilized in the prior art and therefore makes it possible to efficiently control the light distribution characteristics.

According to the present embodiment, the reflecting boards 46, 46' fixed to the optical member 45 are shaped so as to extend in the vertical direction, i.e. perpendicularly to the plane of the figures, but there is no intention to limit the shape of the reflecting boards to the above-mentioned shape. The reflecting boards 46, 46' may be formed as flat surfaces, spherical surfaces, rotary ellipsoids, or the like. It is possible to efficiently change the illumination range by optimizing the shape of the reflecting boards 46, 46'.

According to the embodiments described above, the illuminating device is mounted in a camera using a film, but the illuminating device of the present invention may also be mounted in a variety of photographing apparatuses such as digital still cameras and video cameras. Moreover, the present invention may be applied not only to the illuminating device which is a built-in type installed in a photographing apparatus according to the above described embodiments, but also to an external type illuminating device. Further, the present invention may be applied to an illuminating device for use in optical communication using strobe light.

As described above, according to the embodiments described above, the light source unit (emission unit) and the optical member are moved relative to one another to increase or decrease the luminous flux components reflected by the reflecting sections toward the both ends of the optical member among the fluxes of illumination light emitted from the light source unit are increased or decreased to thus change the range of illumination by the fluxes of illumination light. This realizes an illuminating device that is capable of suitably controlling the illumination range in the longitudinal direction of the light source unit with a simple and compact structure. It is therefore possible to reduce the size and weight of a photographing apparatus in which the illuminating device is mounted, and to improve the photographing performance of the photographing apparatus.

Further, since the illumination range is changed by increasing or decreasing the luminous flux components reflected by the reflecting sections, the illumination range can easily be changed continuously by continuously increasing or decreasing the luminous flux components.

Further, since the reflecting sections are arranged in such positions as to cover the end portions of the exit surface of the emission unit and the total reflection surfaces are used as the reflecting sections, the energy from the light source unit can be utilized efficiently.

Moreover, since the optical member is provided with an optical operation part that moves the light source unit and the optical unit relative to one another so as to change the range of illumination by the fluxes of illumination light in a different direction (e.g. a direction perpendicular to the longitudinal direction of the light source unit) from a direction (the longitudinal direction of the light source unit) in which the illumination range is changed by increasing or decreasing the emitted luminous fluxes components reflected by the reflecting sections, it is possible to realize an illuminating device that is capable of properly controlling the illumination ranges in both of the above-mentioned directions with a simple and compact structure without the need for a mechanism that changes the illumination ranges correlatively in both of the above-mentioned directions, or the like.

It should be noted that if the reflecting sections are provided separately from the optical operation part, it is possible to change the illumination ranges separately in the above-mentioned directions and to raise the degree of freedom in setting the illumination range in any direction.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A light emitting device comprising:
   an emission unit including at least an arc tube being elongated in a longitudinal direction thereof, said arc tube having opposite ends in the longitudinal direction thereof, and a reflection umbrella; and
   a light-permeable optical unit arranged in front of said emission unit at a side thereof closer to a subject in a manner such that a relative distance between said optical unit and said emission unit is variable, said optical unit having reflection surfaces for reflecting luminous fluxes emitted from said emission unit toward the subject, the reflection surfaces being located at locations corresponding to the opposite ends of said arc tube in the longitudinal direction thereof.

2. A light emitting device according to claim 1, wherein said optical unit has a plurality of cylindrical lenses formed at a central portion thereof and arranged in parallel with the longitudinal direction of said arc tube.

3. A light emitting device according to claim 1, wherein the reflection surfaces of said optical unit are disposed such that they do not reflect the luminous fluxes when said optical unit is close to said emission unit but reflect the luminous fluxes when said optical unit is apart from said emission unit.

4. A light emitting device according to claim 1, wherein said emission unit comprises a light refracting section provided at a central portion thereof for refracting light from said arc tube and projecting the light to the subject, said light refracting section having opposite sides, and an optical member having a reflecting section for totally reflecting light from said arc tube to the opposite sides of said light refracting section and projecting the light to the subject.

5. A light emitting device according to claim 1, wherein said optical unit includes prism sections having prism surfaces and projecting from said optical unit toward said arc tube, and wherein said reflection surfaces are the prism surfaces of said prism sections.

6. A camera having a light emitting device according to claim 1.

7. A light emitting device comprising:
   an emission unit including at least an arc tube being elongated in a longitudinal direction thereof, said arc tube having opposite ends in the longitudinal direction thereof, and a reflection umbrella; and
   a light-permeable optical unit arranged in front of said emission unit at a side thereof closer to a subject in a manner such that a relative distance between said optical unit and said emission unit is variable, said optical unit including a plurality of light refracting sections provided at a central portion thereof and arranged in parallel with the longitudinal direction of said arc tube, said light refracting sections having opposite sides in a longitudinal direction thereof, and reflection surfaces provided at the opposite sides in the longitudinal direction of said light refracting sections for reflecting luminous fluxes emitted from said emission unit toward a subject.

8. A light emitting device according to claim 7, wherein said light refracting sections comprise cylindrical lenses.

9. A light emitting device according to claim 7, wherein the reflection surfaces of said optical unit are disposed such that they do not reflect the luminous fluxes when said optical unit is close to said emission unit but reflect the luminous fluxes when said optical unit is apart from said emission unit.

10. A light emitting device according to claim 7, wherein said emission unit comprises a light refracting section provided at a central portion thereof for refracting light from said arc tube and projecting the light to the subject, said light refracting section having opposite sides, and an optical member having a reflecting section for totally reflecting light from said arc tube to the opposite sides of said light refracting section and projecting the light to the subject.

11. A light emitting device according to claim 7, wherein said optical unit includes prism sections having prism surfaces and projecting from said optical unit toward said arc tube, and wherein said reflection surfaces are the prism surfaces of said prism sections.

12. A camera having a light emitting device according to claim 7.

* * * * *